US011912963B2

(12) United States Patent
Kurth et al.

(10) Patent No.: US 11,912,963 B2
(45) **Date of Patent: *Feb. 27, 2024**

(54) DETERGENT OR CLEANING AGENT COMPRISING AT LEAST TWO PHASES

(71) Applicant: Henkel AG & Co. KGaA, Duesseldorf (DE)

(72) Inventors: Oliver Kurth, Langenfeld (DE); Inga Kerstin Vockenroth, Duesseldorf (DE); David Matulla, Hilden (DE); Volker Blank, Leverkusen (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/903,514

(22) Filed: Sep. 6, 2022

(65) Prior Publication Data

US 2022/0411723 A1 Dec. 29, 2022

Related U.S. Application Data

(60) Continuation of application No. 16/838,840, filed on Apr. 2, 2020, which is a division of application No.

(Continued)

(30) Foreign Application Priority Data

Jul. 23, 2015 (DE) ........................ 102015213943.3

(51) Int. Cl.
*C11D 17/00* (2006.01)
*C11D 3/20* (2006.01)

(Continued)

(52) U.S. Cl.
CPC .......... *C11D 3/2044* (2013.01); *C11D 3/2041* (2013.01); *C11D 3/2065* (2013.01); *C11D 3/30* (2013.01); *C11D 3/3753* (2013.01); *C11D 3/384* (2013.01); *C11D 17/0078* (2013.01); *C11D 17/0091* (2013.01); *C11D 17/042* (2013.01); *C11D 17/045* (2013.01); *C11D 1/722* (2013.01); *C11D 11/0023* (2013.01)

(58) Field of Classification Search
None
See application file for complete search history.

(56) References Cited

U.S. PATENT DOCUMENTS 6,194,368 B1 * 2/2001 Waschenbach .... C11D 17/0078 510/378
6,440,927 B1 * 8/2002 Painter ................ C11D 3/0052 510/505

(Continued)

FOREIGN PATENT DOCUMENTS

CA 2488329 A1 * 12/2003

*Primary Examiner* — Lorna M Douyon
(74) *Attorney, Agent, or Firm* — Scully, Scott, Murphy & Presser, P.C.

(57) ABSTRACT

A detergent or cleaning agent, in particular a cleaning agent for hard surfaces, having at least two phases which are different from each other. The detergent or cleaning agent includes at least one first phase and at least one second phase that is different, with the at least one first phase being solid and the at least one second phase having at least one polymer and at least one polyvalent alcohol.

14 Claims, 1 Drawing Sheet

Related U.S. Application Data

15/876,817, filed on Jan. 22, 2018, now Pat. No. 10,626,352, which is a continuation of application No. PCT/EP2016/067260, filed on Jul. 20, 2016.

(51) Int. Cl.

| | |
|---|---|
| ***C11D 3/37*** | (2006.01) |
| ***C11D 3/384*** | (2006.01) |
| ***C11D 17/04*** | (2006.01) |
| ***C11D 3/30*** | (2006.01) |
| *C11D 1/722* | (2006.01) |
| *C11D 11/00* | (2006.01) |

(56) References Cited

U.S. PATENT DOCUMENTS

| | | | | |
|---|---|---|---|---|
| 10,626,352 | B2 * | 4/2020 | Kurth | C11D 3/2041 |
| 11,261,408 | B2 * | 3/2022 | Kurth | C11D 17/0008 |
| 11,268,051 | B2 * | 3/2022 | Sunder | C11D 3/2065 |
| 2004/0018953 | A1 * | 1/2004 | Kinloch | C11D 3/2068 510/503 |
| 2009/0018042 | A1 * | 1/2009 | Wiedemann | C11D 17/0078 510/298 |
| 2010/0113318 | A1 * | 5/2010 | Wiedemann | C11D 11/00 510/218 |
| 2012/0108487 | A1 * | 5/2012 | Graham | C11D 17/042 134/25.2 |
| 2017/0218314 | A1 * | 8/2017 | Roy | C11D 17/06 |

* cited by examiner

DETERGENT OR CLEANING AGENT COMPRISING AT LEAST TWO PHASES

FIELD OF THE INVENTION

The present invention relates to a detergent or cleaning agent, particularly a cleaning agent for hard surfaces, with at least two mutually different phases.

BACKGROUND OF THE INVENTION

Detergents or cleaning agents are usually present in solid form (as a powder, for example) or in liquid form (or also as a flowing gel). Liquid detergents or cleaning agents in particular are increasingly popular with consumers.

Solid detergents or cleaning agents have the advantage that, unlike liquid detergents or cleaning agents, do not require any preservatives. Liquid product formats are increasingly gaining acceptance in the market, particularly due to their quick solubility and the resulting quick availability of the active ingredients they contain. This gives the consumer the option of using abbreviated rinse cycles while still obtaining good cleaning performance.

Furthermore, consumers have grown accustomed to the convenient metering of preportioned machine detergents or cleaning agents, such as dishwashing detergents, and use these products in the form of tablets (solid detergents or cleaning agents) or in the form of pouches that are filled with what is usually a liquid detergent or cleaning agent, although powder-filled pouches are possible as single-use portions. Single-use portions in water-soluble pouches are popular with consumers not only because they no longer come into contact with the chemical composition, but rather not least because of the attractive appearance of the pouches. The appearance of the dosage form is becoming increasingly important. Besides good cleaning performance and sufficient storage stability, a good appearance is one of the reasons on which the selection of a product is based. However, products that are stored in pouches frequently change their visual appearance, which consumers often associate with reduced capacity and degraded cleaning performance.

From the perspective of consumers, it would be desirable to combine the advantages of both product formats and make available a dosage form that is improved compared to the prior art, particularly for detergents or cleaning agents that are usually liquids. Both single-use portioning and a visual appearance that is attractive to consumers should be achieved simultaneously. Surprisingly, it was found that this object can be achieved through the formulation of a flexible phase that is combined with a solid phase.

BRIEF SUMMARY OF THE INVENTION

In a first embodiment, the object on which the present application is based is thus achieved by a detergent or cleaning agent that comprises at least one first phase and at least one second phase that is different therefrom, with the at least one first phase being solid and the at least one second phase comprising at least one polymer and at least one polyvalent alcohol.

In terms of the present invention, a phase is a spatial region in which physical parameters and the chemical composition are homogeneous. One phase differs from another phase through its different features, such as ingredients, physical properties, external appearance, etc. Preferably, different phases can be differentiated visually from one another. A first phase can thus be clearly distinguished by a consumer from the at least one second phase. If the detergent or cleaning agent according to the invention has more than one first phase, then they can also each be distinguished from one another with the naked eye because of their different coloration, for example. The same holds when two or more second phases are present. In this case as well, a visual differentiation of the phases, for example on the basis of a different in coloration or transparency, is possible. In terms of the present invention, phases are thus self-contained regions that can be differentiated visually from one another by a consumer with the naked eye. The individual phases can have different characteristics when used, such as the speed with which the phase dissolves in water and hence the speed and the sequence of the release of the ingredients contained in the respective phase.

According to the invention, the at least one second phase is dimensionally stable at room temperature. During manufacture, the at least one polymer is brought into contact with the at least one polyvalent alcohol. This enables a flowable mixture to be obtained that can be molded as desired. After a certain period of time, a second phase is obtained that remains in the predefined shape, i.e., is dimensionally stable. This time period, the setting time, is preferably 15 minutes or less, more preferably 10 minutes or less, especially preferably 5 minutes. The at least one second phase yields on pressure but is not deformed as a result, but rather returns to its initial state after the pressure has been removed. The at least one second phase is preferably elastic, particularly linear-elastic. The at least one second phase is also preferably transparent, whereby a good visual impression is achieved.

The at least one second phase is sliceable. For example, it can be cut with a knife after it sets without being destroyed beyond the cut that is made. Moreover, the at least one second is particularly flexible. Due to its flexibility and elasticity, it can assume any shape. This also means that it has a level of breaking strength that enables good handling, particularly in terms of transport and storage, but also consumption.

These and other aspects, features, and advantages of the invention will become apparent to a person skilled in the art through the study of the following detailed description. Any feature from one aspect of the invention can be used in any other aspect of the invention. Furthermore, it will readily be understood that the examples contained herein are intended to describe and illustrate but not to limit the invention and that, in particular, the invention is not limited to these examples. Unless indicated otherwise, all percentages indicated are percent by weight. Numerical ranges that are given in the format "from x to y" include the cited values. If several preferred numerical ranges are indicated in this format, it is self-evident that all ranges that result from the combination of the various endpoints are also included.

As used herein, "at least one" refers to 1 or more, i.e., 1, 2, 3, 4, 5, 6, 7, 8, 9, or more. In relation to an ingredient, the expression refers to the type of ingredient and not to the absolute number of molecules. "At least one bleach catalyst" therefore means at least one type of bleach catalyst, for example—that is, that one type of bleach catalyst or a mixture of several different bleach catalysts can be used. Together with weight data, the expression refers to all compounds of the indicated type that are contained in the composition/mixture, that is, that the composition does not contain any other compounds of this type beyond the indicated quantity of the corresponding compounds.

When reference is made herein to molar masses, this information always refers to the number-average molar mass $M_n$ unless explicitly indicated otherwise. The number average of the molar mass can be determined, for example, by means of gel permeation chromatography (GPC) according to DIN 55672-1:2007-08 with THF as the eluent. The number-average molar mass $M_w$ can also be determined by means of GPC as described for $M_n$.

Unless explicitly indicated otherwise, all percentages that are cited in connection with the compositions described herein refer to wt % (percent by weight) with respect to the respective mixture.

DETAILED DESCRIPTION OF THE INVENTION

Figure 1:
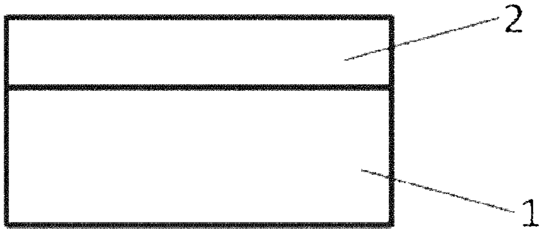
FIG. 1 schematically shows the arrangement of a first phase (1) on or next to a second phase (2)

In a preferred embodiment, the at least one first phase is present in compressed form. In this embodiment, the detergent or cleaning agent according to the invention thus comprises at least one first solid, compressed phase as well as at least one second phase that comprises at least one polymer as well as at least one polyvalent alcohol.

Certain minimum requirements are placed on formulations of the at least one second phase. For instance, as already stated, the second phase must always set within as short a time as possible. Long setting times would result in excessively long production times and thus to high costs. According to the invention, "setting time" refers to the period of time during production within which the at least one second phase goes from a flowable state to a state that is non-flowable and dimensionally stable at room temperature. Room temperature is to be understood as a temperature of 20° C. Without constituting a restriction, this can be done through the crosslinking of the at least one polymer.

Furthermore, the second phase must be stable in storage, particularly in common storage conditions. The second phase according to the invention is a component of a detergent or cleaning agent. Detergents or cleaning agents are usually stored for a certain period of time in a household. They are usually stored near the washing machine. The second phase should be stable in such storage conditions. Therefore, the second phase should be stable and not deform or otherwise change in consistency over a storage period of 4 to 12, particularly 10 to 12 weeks or longer at a temperature of up to 40° C., especially 30° C., particularly 25° C. or 20° C.

The surface of the second phase should differ clearly from the first phase by a distinct luster, for example. The surface of the solid at least one first phase is usually not glossy but rather matte, dull, or muted, so that it is possible to make a clear distinction through the luster that makes the detergent or cleaning agent attractive to consumers.

A change in volume or shrinkage during storage would be disadvantageous, since that would diminish consumers' acceptance of the product. The emergence of liquid or the sweating-out of components from the second phase is also not desired. Here, too, the visual impression is relevant, for one. The stability of the second phase can be influenced by the leakage of liquid, such as solvent, for example, so that the components are no longer stably contained, which can also impact the detergent or cleaning effect.

Moreover, it should be possible for the at least one first phase and the at least one second phase to be in direct contact with one another. In this case, there should no negative interaction between the first phase and the second phase. What no negative interaction means here, for example, is that no ingredients or solvents go from one phase into the other or that the stability, particularly storage stability, preferably for 4 weeks and a storage temperature of 30° C., and/or the aesthetics of the product are not impaired in any way, for example through a change in color, the formation of wet-looking edges, a blurred boundary between the two phases, or the like.

Surprisingly, it was found that an especially high level of storage stability is achieved if the second phase is substantially water-free. This means that the second phase is preferably substantially free of water. "Substantially free" means here that small quantities of water can be contained in the second phase. For example, this water can be introduced into the phase through a solvent or as crystallization water or as a result of reactions of components of the phase with each other. However, no water is introduced as a solvent for the manufacture of the second phase. The water fraction in the second phase is particularly 15 wt % or less or 10 wt % or less, especially 7 wt % or less, particularly 6 wt % or 5 wt % or less, preferably 2 wt % or less, particularly 1 wt % or less, especially 0.5 wt % or less, particularly 0.1 wt % or 0.05 wt % or less. The specifications in wt % refer to the total weight of the second phase.

The at least one second phase comprises at least one polymer. The at least one polymer is particularly suitable for forming a network. According to the invention, the at least one second phase can have one polymer, two or more mutually different polymers. In particular, it has one, two, or more, particularly one or two, preferably one polymer that is suitable for forming a network. Moreover, the at least one second phase can have one or more polymers that do not form a network but result in a thickening and thus to an increasing of the dimensional stability of the at least one second phase—so-called thickening polymers. In a preferred embodiment, the at least one second phase thus comprises at least one, preferably one polymer for network formation as well as one or more thickening polymers.

Preferably, the at least one second phase comprises PVA (polyvinyl alcohol) and or gelatins as polymers that are suitable for forming networks. Furthermore, the at least one second phase preferably comprises a thickening polymer and particularly polycarboxylate as a thickening polymer.

Polyvinyl alcohols are thermoplastic plastics that are manufactured as white to yellowish powders, usually through the hydrolysis of polyvinyl acetate. Polyvinyl alcohol (PVA) is resistant to almost all water-free organic solvents. Polyvinyl alcohols with a molar mass from 30,000 to 60,000 g/mol are preferred.

Gelatin is a mixture of substances composed of taste-neutral animal protein. The main component is denatured or hydrolyzed collagen, which is produced from the connective tissue of various animal species. Gelatin lacks the essential amino acid tryptophan, so it is not considered to be a complete protein. Gelatin swells in water and dissolves when heated starting at about 50° C. When cooled, it forms a gel that liquefies again when reheated.

Surprisingly, it was found that PVA and/or gelatin is especially well suited to producing second phases that meet the specifications outlined above. At least one second phase that has gelatin and/or PVA as well as at least one polyvalent alcohol is therefore especially preferred. Especially preferably, the at least one second phase has gelatin and at least one polyvalent alcohol. The at least one second phase also preferably has PVA and at least one polyvalent alcohol.

According to the invention, the at least one second phase comprises the polymer that is suitable for forming networks in a fraction of about 5 wt % to 40 wt %, particularly 10 wt % to 35 wt %, preferably 15 wt % to 20 wt %. Substantially lower fractions of polymer, particularly gelatin and/or PVA, do not result in the formation of a stable gel-like second phase. Instead, permanent flowing is observed here. Fractions of greater than 40 wt % and particularly of greater than 20 wt % result in an extended setting time. The phases remain soft for longer, which results in an extended manufacturing process. The values each refer to the total weight of the second phase.

Especially preferably, the at least one second phase comprises gelatin. Surprisingly, it was found that, with the aid of gelatin, dimensionally stable second phases can be produced within a short curing time. What is more, the shape and size of phases manufactured in this way remain stable over a long period of time. No size-shrinkage is observed. It has been observed that the quantity of gelatin that must be used varies as a function of the bloom value. Preferred, the second phase therefore has gelatin with a bloom value in the range from 60 to 225. The bloom value describes the gel strength or gelling quality of gelatin. The characteristic number is the mass in grams that is required in order for a stamp measuring 0.5 inches in diameter to deform the surface of a 6.67% gelatin/water mixture four millimeters deep without breaking it. The experiment is conducted in a standardized manner at exactly 10° C. with previous aging of the gelatin for 17 hours.

If the at least one second phase comprises gelatin having a bloom value of 150 or greater, particularly from 180 to 225, preferably from 200 to 225, then the gelatin fraction with respect to the total weight of the second phase is preferably in the range from 10 wt % to 20 wt %, particularly from 15 wt % to 18 wt %. If the bloom value is less than 150, particularly from 60 to 120, preferably from 60 to 100, then the gelatin fraction with respect to the total weight of the second phase is preferably in the range from 15 wt % to 30 wt %, particularly from 20 wt % to 25 wt %. Gelatin with a bloom value of 180 or greater, particularly 200 or greater, especially of 225, is preferred. The use of gelatin with a corresponding bloom value enables the viscosity of the second phase to be controlled well during manufacture. What is more, the quantity of gelatin required here is less than when gelatins having a lower bloom value are used, which can result in a cost reduction.

If the at least one second phase comprises not only gelatin but also PVA, the tenacity of the second phase during manufacture is increased.

Surprisingly, it was found that gelatin, together with anionic polymers or copolymer, particularly with sulfopolymers, leads to the formation of second phases with nonsensitive surfaces. Such surfaces can be touched by an end consumer without having material adhere to his hands. Nor does any erosion of material occur in packaging. It is therefore preferred that the second phase contain gelatin and an anionic copolymer/polymer. The anionic polymer fraction is preferably 1 wt % to 35 wt %, particularly 3 wt % to 30 wt %, especially 5 wt % to 25 wt %, preferably 5 wt % to 20 wt % with respect to the total weight of the second phase. Sulfopolymers also provide the surface with an outstanding luster. What is more, fingerprints are not left behind. The sulfopolymer fraction, particularly the fraction of sulfopolymers with AMPS as the sulfonic acid group-containing monomer, such as Acusol 590, Acusol 588, or Sokalan CP50, for example, is therefore preferably 1 wt % to 25 wt %, particularly 3 wt % to 15 wt %, especially 4 wt % to 12 wt %, preferably 5 wt % to 10 wt % with respect to the weight of the second phase. In an especially preferred embodiment, the at least one second phase therefore comprises gelatin as well as a sulfopolymer and at least one polyvalent alcohol.

According to the invention, the at least one second phase can further comprise thickening polymer. This is preferably a polycarboxylate. A copolymeric polyacrylate, preferably a sulfopolymer, preferably a copolymeric polysulfonate, preferably a hydrophobically modified copolymeric polysulfonate is preferably used as the polycarboxylate. The copolymers can have two, three, four, or more different monomer units. Preferred copolymeric polysulfonates contain, besides sulfonic acid group-containing monomer(s), at least one monomer from the group of the unsaturated carboxylic acids.

Unsaturated carboxylic acids of the formula $R^1(R^2)C{=}C(R^3)COOH$ are especially preferably used in which $R^1$ to $R^3$, independently of one another, stand for —H, —$CH_3$, a straight-chain or branched saturated alkyl residue with 2 to 12 carbon atoms, a straight-chain or branched, mono- or polyunsaturated alkenyl residue with 2 to 12 carbon atoms, with —$NH_2$, —OH, or —COOH substituted alkyl or alkenyl residues as defined above, or for —COOH or —$COOR^4$, with $R^4$ being a saturated or unsaturated, straight-chain or branched hydrocarbon residue with 1 to 12 carbon atoms.

Especially preferred unsaturated carboxylic acids are acrylic acid, methacrylic acid, ethacrylic acid, α-chloroacrylic acid, α-cyanoacrylic acid, crotonic acid, α-phenylacrylic acid, maleic acid, maleic anhydride, fumaric acid, itaconic acid, citraconic acid, methylenemalonic acid, sorbic acid, cinnamic acid, or mixtures thereof. The unsaturated dicarboxylic acids can obviously also be used.

Among the sulfonic acid group-containing monomers, those of the formula $R^5(R^6)C{=}C(R^7)—X—SO_3H$ are preferred in which $R^5$ to $R^7$, independently of one another, stand for —H, —$CH_3$, a straight-chain or branched saturated alkyl residue with 2 to 12 carbon atoms, a straight-chain or branched, mono- or polyunsaturated alkenyl residue with 2 to 12 carbon atoms, with —$NH_2$, —OH, or —COOH substituted alkyl or alkenyl residues, or for —COOH or —$COOR^4$, with $R^4$ being a saturated or unsaturated, straight-chain or branched hydrocarbon residue with 1 to 12 carbon atoms, and X stands for an optionally present spacer group that is selected from among —$(CH_2)n$- where n=0 to 4, —COO—$(CH_2)k$- where k=1 to 6, —C(O)—NH—$C(CH_3)_2$—, —C(O)—NH—$C(CH_3)_2$—$CH_2$—, and —C(O)—NH—$CH(CH_3)$—$CH_2$—.

Among these monomers, those of the formulas $H_2C{=}CH—X—SO_3H$, $H_2C{=}C(CH_3)—X—SO_3H$ or $H03S—X—(R^6)C{=}C(R^7)—X—SO_3H$ are preferred in which $R^6$ and $R^7$, independently of one another, are selected from among —H, —$CH_2CH_3$, —$CH_2CH_2CH_3$, and —$CH(CH_3)_2$, and X stands for an optionally present spacer group that is selected from among —$(CH_2)n$- where n=0 to 4, —COO—$(CH_2)$k- where k=1 to 6, —C(O)—NH—$C(CH_3)_2$—, —C(O)—NH—$C(CH_3)_2$—$CH_2$—, and —C(O)—NH—$CH(CH_3)$—$CH_2$—.

Especially preferred sulfonic acid group-containing monomers are 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxy-propanesulfonic acid, allyl sulfonic acid, methallyl sulfonic acid, allyloxybenzene sulfonic acid, methallyloxybenzene sulfonic acid, 2-hydroxy-3-(2-propenyloxy)propanesulfonic acid, 2-methyl-2- propenl-sulfonic acid, styrenesulfonic acid, vinylsulfonic acid, 3-sulfopropylacrylate, 3-sulfopropylmethacrylate, sulfomethacrylamide, sulfomethylmethacrylamide, as well as mixtures of the above acids or water-soluble salts thereof. In the polymers, the sulfonic acid groups can be present entirely or partially in neutralized form; that is, the acidic hydrogen atom of the sulfonic acid group can be exchanged in some or all of the sulfonic acid groups for metal ions, preferably alkali metal ions, and for sodium ions. The use of partially or fully neutralized sulfonic acid group-containing copolymers is preferred according to the invention.

In copolymers that contain only carboxylic acid group-containing monomers and sulfonic acid group-containing monomers, the monomer distribution of the copolymers that are preferably used according to the invention is preferably 5 to 95 wt %; especially preferably, the fraction of sulfonic acid group-containing monomers is 50 to 90 wt %, and the fraction of carboxylic acid group-containing monomers is 10 to 50 wt %, with the monomers being preferably selected from among those mentioned above. The molar mass of the sulfo-copolymers that are preferably used according to the invention can be varied in order to adapt the characteristics of the polymers to the desired use. Preferred cleaning agents are wherein the copolymers have molar masses from 2,000 to 200,000 $g \cdot mol^{-1}$, preferably from 4,000 to 25,000 $g \cdot mol^{-1}$, and particularly from 5,000 to 15,000 $g \cdot mol^{-1}$.

In another preferred embodiment, the copolymers comprise not only carboxyl group-containing monomers and sulfonic acid group-containing monomers but also at least one nonionic, preferably hydrophobic monomer. Particularly, the rinsing performance of dishwashing detergents according to the invention was able to be improved through the use of these hydrophobically modified polymers.

Especially preferably, the at least one second phase further comprises an anionic copolymer, with a copolymer comprising i) carboxylic acid group-containing monomers
ii) sulfonic acid group-containing monomers
iii) nonionic monomers, particularly hydrophobic monomers being used as the anionic copolymer.

Monomers of the general formula $R^1$ $(R^2)C{=}C(R^3)$—X—$R^4$ are preferably used as nonionic monomers in which $R^1$ to $R^3$, independently of one another, stand for —H, —$CH_3$ or —$C_2H_5$, X stands for an optionally present spacer group that is selected from among —$CH_2$—, —C(O)O— and —C(O)—NH—, and $R^4$ stands for a straight-chain or branched saturated alkyl residue with 2 to 22 carbon atoms or for an unsaturated, preferably aromatic residue with 6 to 22 carbon atoms.

Especially preferred nonionic monomers are butene, isobutene, pentene, 3-methylbutene, 2-methylbutene, cyclopentene, hexene, hexene-1,2-methlypentene-1,3-methylpentene-1, cyclohexene, methylcyclopentene, cycloheptene, methylcyclohexene, 2,4,4-trimethylpentene-1,2,4,4-trimethylpentene-2,2,3-dimethylhexene-1,2,4-diemthylhexene-1,2,5-dimethlyhexene-1,3,5-dimethylhexene-1,4,4-dimethylhexane-1, ethylcyclohexyn, 1-octene, α-olefins with 10 or more carbon atoms such as, for example 1-decene, 1-dodecene, 1-hexadecene, 1-octadecene and $C_{22}$-α-olefin, 2-styrene, α-methylstyrene, 3-methylstyrene, 4-propylstyrene, 4-cyclohexylstyrene, 4-dodecylstyrene, 2-ethyl-4-benzylstyrene, 1-vinyl naphthalene, 2-vinyl naphthalene, acrylic acid methyl ester, acrylic acid ethyl ester, acrylic acid propyl ester, acrylic acid butyl ester, acrylic acid pentyl ester, acrylic acid hexyl ester, methacrylic acid methyl ester, N-(methyl)acrylamide, acrylic acid-2-ethylhexyl ester, methacrylic acid-2-ethylhexyl ester, N-(2-ethylhexyl)acrylamide, acrylic acid octyl ester, methacrylic acid octyl ester, N-(octyl)acrylamide, acrylic acid lauryl ester, methacrylic acid lauryl ester, N-(lauryl)acrylamide, acrylic acid stearyl ester, methacrylic acid stearyl ester, N-(stearyl)acrylamide, acrylic acid behenyl ester, methacrylic acid behenyl ester, and N-(behenyl)acrylamide or mixtures thereof, particularly acrylic acid, ethyl acrylate, 2-acrylamido-2-methylpropane sulfonic acid (AMPS) as well as mixtures thereof.

According to the invention, the at least one second phase can also comprise additional polymers, such as PEG, for example, particularly those polyethylene glycols with an average molar mass between about 200 and 8,000, between about 800 and 4,000 g/mol, especially preferably with an average molar mass between 1,000 and 2,000 g/mol, for example around 1500 g/mol (INCI: PEG1500), which increase the stability of the second phase.

The at least one second phase comprises at least one polyvalent alcohol. The at least one polyvalent alcohol enables the manufacture of a dimensionally stable, non-flowable second phase within a short setting time that within 15 minutes or less, particularly 10 minutes or less. Polyvalent alcohols in terms of the present invention are hydrocarbons in which two, three, or more hydrogen atoms are replaced by OH groups. The OH groups are each bonded to different carbon atoms. No carbon atom has two OH groups. This is in contrast to (simple) alcohols, in which only one hydrogen atom is replaced by an OH group in hydrocarbons. Polyvalent alcohols with two OH groups are referred to as alkanediols, and polyvalent alcohols with three OH groups as alkanetriols. A polyvalent alcohol thus corresponds to the general formula $[KW](OH)_x$, with KW standing for a hydrocarbon that is linear or branched, saturated or unsaturated, substituted or unsubstituted. A substitution can occur with —SH or —NH groups, for example. Preferably, KW is a linear or branched, saturated or unsaturated, unsubstituted hydrocarbon. KW comprises at least two carbon atoms. The polyvalent alcohol comprises 2, 3, or more OH groups (x=2, 3, 4 . . . ), with only one OH group being bonded to each C atom of the KW. Especially preferably, KW comprises 2 to 10—i.e., 2, 3, 4, 5, 6, 7, 8, 9, or 10—carbon atoms. Polyvalent alcohols in which x=2, 3, or 4 can be used in particular (for example, pentaerythritol where x=4). Preferably, x=2 (alkanediol) and/or x=3 (alkanetriol).

Especially preferably, the at least one second phase comprises at least one alkanetriol and/or at least one alkanediol, particularly at least one $C_3$ to $C_{10}$ alkanetriol and/or at least one $C_3$ to $C_{10}$ alkanediol, preferably at least one $C_3$ to $C_8$ alkanetriol and/or at least one $C_3$ to $C_8$ alkanediol, especially at least one $C_3$ to $C_6$ alkanetriol and/or at least one $C_3$ to $C_5$ alkanediol as a polyvalent alcohol. Preferably, it comprises an alkanetriol and an alkanediol as at least one polyvalent alcohol. In a preferred embodiment, the at least second phase thus comprises at least one polymer, particularly gelatin and/or PVA, as well as at least one alkanediol and at least one alkanetriol, particularly one alkanetriol and one alkanediol. A second phase that comprises at least one polymer, particularly gelatin and/or PVA, as well as a $C_3$ to $C_8$ alkanediol and a $C_3$ to $C_8$ alkanetriol is also preferred. Also preferred is a second phase that comprises at least one polymer, particularly gelatin and/or PVA, as well as a $C_3$ to $C_8$ alkanediol and a $C_3$ to $C_6$ alkanetriol.

Surprisingly, it was found that, when a suitable triol (alkanetriol) is combined with a suitable diol (alkanediol), especially short setting times can be achieved. What is more, the second phases that are obtained are transparent and have a shiny surface, which provides for an attractive visual impression of the detergent or cleaning agent according to the invention. The terms "diol" and "alkanediol" are used synonymously herein. The same applies to "triol" and "alkanetriol."

According to the invention, the polyvalent alcohols do not comprise any derivatives thereof, such as ethers, esters, etc.

The quantity of polyvalent alcohol or polyvalent alcohols used in second phases according to the invention is preferably at least 45 wt %, particularly 55 wt % or more. Preferred quantity ranges are from 5 wt % to 75 wt %, particularly from 10 wt % to 70 wt %, with respect to the total weight of the second phase.

Preferably, the $C_3$- to $C_6$ alkanetriol is glycerin and/or 2-ethyl-2-(hydroxymethyl)-1,3-propanediol (also called 1,1,1-trimethylolpropane) and/or 2-amino-2-(hydroxymethyl)-1,3-propanediol (TRIS, tris hydroxymethyl aminoethane).

Especially preferably, the $C_3$- to $C_6$ alkanetriol is glycerin and/or 2-ethyl-2-(hydroxymethyl)-1,3-propanediol (also called 1,1,1-trimethylolpropane). The $C_3$- to alkanediol is preferably 1,3-propanediol and/or 1,2-propanediol. Surprisingly, it was found that the chain length of the diol as well as, in particular, the position of the OH groups has an influence on the transparency of the second phase. The OH groups of the diol are therefore preferably not arranged on immediately adjacent C atoms. In particular, three or four carbon atoms, particularly 3 carbon atoms, are located between the two OH groups of the diol. Especially preferably, the diol is 1,3-propanediol. Surprisingly, it was found that especially good results are obtained with mixtures that comprise glycerin and 1,3-propanediol and/or 1,2-propanediol. Especially preferably, the second phase comprises gelatin, glycerin, and 1,3-propanediol or gelatin, 1,1,1-trimethylolpropane and 1,3-propanediol. Here, a dimensionally stable, non-flowable consistency can be achieved within a setting time of 10 minutes or less and at room temperature that remains dimensionally stable even after an extended storage period. In addition, such a phase is transparent and has a shiny surface. An especially preferred second phase therefore comprises gelatin or PVA as a polymer and 1,3-propanediol and glycerin or 1,1,1-trimethylolpropane as polyvalent alcohols.

If the second phase comprises an alkanetriol, particularly glycerin or 1,1,1-trimethylolpropane, then the fraction of alkanetriol, particularly glycerin or 1,1,1-trimethylolpropane, is preferably 5 wt % to 70 wt %, particularly 10 wt % to 65 wt %, especially 20 wt % to 40 wt %, with respect to the total weight of the second phase.

If the second phase optionally comprises several alkanetriol(s), then the total fraction of alkanetriol(s) with respect to the total weight of the second phase is preferably 5 wt % to 70 wt %, particularly 10 wt % to 65 wt %, especially 20 wt % to 40 wt %.

If glycerin is contained as alkanetriol in the second phase, then the fraction of glycerin with respect to the total weight of the second phase is preferably 5 wt % to 70 wt %, particularly 10 wt % to 65 wt %, especially 20 wt % to 40 wt %.

If 1,1,1-trimethylolpropane is contained in the second phase, then the fraction of 1,1,1-trimethylolpropane with respect to the total weight of the second phase is preferably 5 wt % to 70 wt %, particularly 10 wt % to 65 wt %, especially 20 wt % to 40 wt %. If 2-amino-2-hydroxymethyl-1,3-propanediol.

If 2-amino-2-hydroxymethyl-1,3-propanediol is contained in the second phase, then the fraction of 2-amino-2-hydroxymethyl-1,3-propanediol with respect to the total weight of the second phase is preferably 5 wt % to 70 wt %, particularly 10 wt % to 65 wt %, especially 20 wt % to 40 wt %.

If several alkanediols are optionally contained in the second phase, then the of alkanediols with respect to the total weight of the second phase is preferably 5 wt % to 70 wt %, particularly 10 wt % to 65 wt %, especially 20 wt % to 40 wt %.

If the second phase comprises an alkanediol, particularly 1,3-propanediol, then the fraction alkanediol, particularly 1,3-propanediol, with respect to the total weight of the second phase is preferably 5 wt % to 70 wt %, particularly 10 wt % to 65 wt %, especially 20 wt % to 45 wt %. If 1,3-propanediol is contained in the second phase, then the fraction of 1,3-propanediol with respect to the total weight of the second phase is preferably 5 wt % to 70 wt %, particularly 10 wt % to 65 wt %, especially 20 wt % to 45 wt %.

A second phase is preferred which contains 20 to 45 wt % 1,3-propanediol and 10 wt % to 65 wt % 2-amino-2-hydroxymethyl-1,3-propanediol, each with respect to the total weight of the second phase. A second phase is also preferred which contains 20 to 45 wt % 1,3-propanediol and 10 wt % to 65 wt % 1,1,1-trimethylolpropane, each with respect to the total weight of the second phase. A second phase is particularly preferred which contains 20 to 45 wt % 1,3-propanediol and 10 wt % to 65 wt % glycerin, each with respect to the total weight of the second phase.

It was found that, in these ranges, a quick setting of a second phase is possible at 20° C. and yields phases that are storage-stable and transparent. In particular, the glycerin fraction has an impact on the curing time.

If the at least one second phase according to the invention has a $C_3$ to $C_6$ alkanetriol and a $C_3$ to C5 alkanediol, then the weight ratio is preferably 3:1 to 2:1. In particular, the weight ratio is 2:1 if glycerin and 1,3-propanediol are contained as polyvalent alcohols. Surprisingly, it was found that, with these weight ratios, storage-stable, shiny, transparent second phases can be obtained within short setting times of 10 minutes or less at 20° C.

The detergent or cleaning agent according to the invention preferably comprises at least one surfactant. This surfactant is selected from the group of the anionic, nonionic, and cationic surfactants. The detergent or cleaning agent according to the invention can also contain mixtures of several surfactants that are selected from the same group.

According to the invention, the at least one first phase and the at least one second phase each contain at least one surfactant. It is also possible, however, for only the at least one first phase or only the at least one second phase to comprise at least one surfactant. If both phases comprise a surfactant, then they are preferably mutually different surfactants. It is also possible, however, for the first and second phases to have the same surfactant or surfactants. The at least one first and/or second phases according to the invention preferably contain at least one nonionic surfactant. All nonionic surfactants that are known to a person skilled in the art can be used as nonionic surfactants. Preferably, low-foaming nonionic surfactants are used, particularly alkoxylated, especially ethoxylated, low-foaming nonionic surfactants. These will be specified in greater detail below.

Suitable nonionic surfactants include alkyl glycosides of the general formula RO(G)x, for example, in which R corresponds to a primary straight-chain or methyl-branched aliphatic residue, particularly an aliphatic residue that is methyl-branched in the 2 position, with 8 to 22, preferably 12 to 18 C atoms, and G is the symbol that stands for a glycose unit with 5 or 6 C atoms, preferably for glucose. The degree of oligomerization x, which indicates the distribution of monoglycosides and oligoglycosides, is any number between 1 and 10; preferably, x is from 1.2 to 1.4.

Another class of preferred nonionic surfactants, which are used either as the sole nonionic surfactant or in combination with other nonionic surfactants, are alkoxylated, preferably ethoxylated or ethoxylated and propoxylated fatty acid alkyl esters, preferably with 1 to 4 carbon atoms in the alkyl chain.

Nonionic surfactants of the type of the aminoxides, for example N-cocoalkyl-N,N-dimethylamine oxide and N-tallow alkyl-N,N-dihydroxyethylamine oxide, and of the fatty acid alkanolamides can also be suitable. The quantity of these nonionic surfactants is preferably no more than that of the ethoxylated fatty alcohols, particularly no more than half thereof.

Additional suitable surfactants are the polyhydroxy fatty acid amides that are known as PHFAs. Especially preferably, the detergents or cleaning agents according to the invention, particularly cleaning agents for dishwashers, contain nonionic surfactants from the group of the alkoxylated alcohols. Nonionic surfactants that are preferably used are alkoxylated, preferably ethoxylated, particularly primary alcohols with preferably 8 to 18 C atom and, on average, 1 to 12 mols of ethylene oxide (EO) per mol of alcohol in which the alcohol residue can be linear or preferably methyl-branched in the 2 position, or it can contain linear and methyl-branched residues in admixture, as are usually present in oxa-alcohol residues. In particular, however, alcohol ethoxylates with linear residues from alcohols of native origin with 12 to 18 C atoms, for example from coconut, palm, tallow fat, or oleyl alcohol, and 2 to 8 EO per mol of alcohol on average are preferred. Examples of preferred ethoxylated alcohols are $C_{12-14}$ alcohols with 3 EO or 4 EO, $C_{8-11}$ alcohols with 7 EO, $C_{13-15}$ alcohols with 3 EO, 5 EO, 7 EO or 8 EO, $C_{12-18}$ alcohols with 3 EO, 5 EO or 7 EO, and mixtures thereof, such as mixtures of $C_{12-14}$ alcohol with 3 EO and C12-18 alcohol with 5 EO.

Preferred alcohol ethoxylates have a narrowed homolog distribution (narrow range ethoxylates, NRE). In addition to these nonionic surfactants, fatty alcohols with more than 12 EO can also be used. Examples of these are tallow fatty alcohol fatty alcohols with 14 EO, 25 EO, 30 EO, or 40 EO.

Ethoxylated nonionic surfactants are especially preferably used which were obtained from $C_{6-20}$ monohydroxy alkanols or $C_{6-20}$ alkyl phenols or $C_{16-20}$ fatty alcohols and greater than 12 mols, preferably greater than 15 mols, and particularly greater than 20 mols of ethylene oxide per mol of alcohol. An especially preferred nonionic surfactant is obtained from a straight-chain fatty alcohol with 16 to 20 carbon atoms ($C_{16-20}$ alcohol), preferably from a $C_{18}$ alcohol and at least 12 mols, preferably at least 15 mols and particularly at least 20 mols of ethylene oxide. Among these, the so-called "narrow-range ethoxylates" are especially preferred.

Surfactants that are preferably used originate from the group of the alkoxylated nonionic surfactants, particularly the ethoxylated primary alcohols and mixtures of these surfactants with structurally complicated surfactants such as polyoxypropylene/polyoxyethylene/polyoxypropylene ((PO/EO/PO) surfactants). Such (PO/EO/PO) nonionic surfactants are also characterized by good foam control.

In relation to the present invention, low-foaming nonionic surfactants have proven to be especially preferred which have alternating ethylene oxide and alkylene oxide units. Among these, in turn, surfactants with EO-AO-EO-AO blocks are preferred, with one to ten EO groups and AO groups being respectively bonded to each other before a block follows from the respective other groups. Here, nonionic surfactants of the general formula $$R^1—O—(CH_2—CH_2—O)_w—(CH_2—\underset{R^2}{\underset{|}{CH}}—O)_x—(CH_2—CH_2—O)_y—(CH_2—\underset{R^3}{\underset{|}{CH}}—O)_z—H$$

are preferred, in which $R^1$ stands for a straight-chain or branched, saturated or mono- or polyunsaturated $C_{6-24}$ alkyl or alkenyl residue; each $R^2$ and $R^3$ group is selected independently of one another from among —$CH_3$, —$CH_2CH_3$, —$CH_2CH_2$—$CH_3$, —$CH(CH_3)_2$, and the indices w, x, y, z, independently of one another, stand for integers from 1 to 6.

Preferred nonionic surfactants of the above formula can be produced using known methods from the corresponding alcohols $R^1$—OH and ethylene or alkylene oxide. The $R^1$ residue in the above formula can vary depending on the origin of the alcohol. If native sources are used, the $R^1$ residue has an even number of carbon atoms and is generally unbranched, with the linear residues of alcohols of native origin with 12 to 18 C atoms, such as coconut, palm, tallow fat, or oleyl alcohol, for example, being preferred. Some examples of alcohols that are available from synthetic sources are the Guerbet alcohols or residues that are methyl-branched in the 2 position, or mixtures of residues that are linear and methyl-branched, such as those usually present in oxa-alcohol residues. Independently of the approach taken in the manufacture of the alcohol used in the nonionic surfactants contained in the agents, nonionic surfactants are preferred in which $R^1$ stands for an alkyl residue with 6 to 24, preferably 8 to 20, especially preferably 9 to 15, and particularly 9 to 11 carbon atoms in the above formula.

Besides propylene oxide, butylene oxide in particular is worthy of consideration as an alkylene oxide unit that is contained alternately with the ethylene oxide unit in the preferred nonionic surfactants. However, other alkylene oxides in which $R^2$ and $R^3$ are selected independently of one another from —$CH_2CH_2$—$CH_3$ and —$CH(CH_3)_2$ are also suitable. Preferably, nonionic surfactants of the above formula are used in which $R^2$ and $R^3$ stand for a —$CH_3$ residue, w and x, independently of one another, stand for values of 3 or 4, and y and z, independently of one another, stand for values of 1 or 2.

Other nonionic surfactants of the first phase that are preferably used are nonionic surfactants of the general formula $R^1O(AlkO)_xM(OAlk)_yOR^2$, where $R^1$ and $R^2$, independently of one another, stand for a branched or unbranched, saturated or unsaturated, optionally hydroxylated alkyl residue with 4 to 22 carbon atoms; Alk stands for a branched or unbranched alkyl residue with 2 to 4 carbon atoms; x and y, independently of one another, stand for values between 1 and 70; and M stands for an alkyl residue from the group $CH_2$, $CHR^3$, $CR^3R^4$, $CH_2CHR^3$, and $CHR^3CHR^4$, where $R^3$ and $R^4$, independently of one another stand for a branched or unbranched, saturated or unsaturated alkyl residue with 1 to 18 carbon atoms.

Nonionic surfactants of the general formula $R^1—CH(OH)CH_2—O(CH_2CH_2O)_xCH_2CHR(OCH_2CH_2)_y—CH_2CH(OH)—R^2$ are preferred, where R, $R^1$ and $R^2$, independently of one another, stand for an alkyl residue or alkenyl residue with 6 to 22 carbon atoms; x and y, independently of one another, stand for values between 1 and 40.

Compounds of the general formula $R^1—CH(OH)CH_2—O(CH_2CH_2O)_xCH_2CHR(OCH_2CH_2)_yO—CH_2CH(OH)—R^2$ are particularly preferred in which R stands for a linear, saturated alkyl residue with 8 to 16 carbon atoms, preferably 10 to 14 carbon atoms, and n and m, independently of one another, have values from 20 to 30. Such compounds can be obtained, for example, through the conversion of alkyl diols HO—CHR—$CH_2$—OH with ethylene oxide, with a conversion with an alkyl epoxide being performed subsequently in order to occlude the free OH functions under the formation of a dihydroxy ether.

Preferred nonionic surfactants are those of the general formula $R^1—CH(OH)CH_2O-(AO)_w-(AO)_x-(A''O)_y-(A'''O)_zR^2$, in which

- $R^1$ stands for a straight-chain or branched, saturated or mono- or polyunsaturated $C_{6-24}$ alkyl or alkenyl residue;
- $R^2$ stands for hydrogen or a linear or branched hydrocarbon residue with 2 to 26 carbon atoms;
- A, A', A'' and A''', independently of one another, stand for a residue from the group $—CH_2CH_2$, $—CH_2CH_2—CH_2$, $—CH_2—CH(CH_3)$, $—CH_2—CH_2—CH_2—CH_2$, $—CH_2—CH(CH_3)—CH_2—$, $—CH_2—CH(CH_2—CH_3)$;
- w, x, y and z stand for values between 0.5 and 120, where x, y and/or z can also be 0.

Through the addition of the abovementioned nonionic surfactants of the general formula $R^1—CH(OH)CH_2O-(AO)_w-(A'O)_x-(A''O)_y-(A'''O)_z—R^2$, hereinafter al so called "Hydroxy Mixed Ethers," the cleaning performance of preparations according to the invention can be surprisingly improved, particularly both in comparison to surfactant-free systems and in comparison to systems that contain alternative nonionic surfactants, such as those from the group of the polyalkoxylated fatty alcohols, for example.

Through the use of these nonionic surfactants with one or more free hydroxyl groups on one or both terminal alkyl residues, the stability of the enzymes contained in the cleaning agent preparations according to the invention can be improved substantially.

In particular, those end-capped poly(alkoxylated) nonionic surfactants are preferred which, according to the following formula

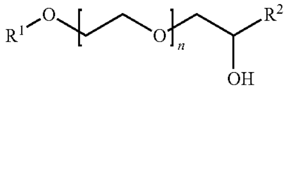

besides a residue $R^1$, which stands for linear or branched, saturated or unsaturated, aliphatic or aromatic hydrocarbon residues with 2 to 30 carbon atoms, preferably with 4 to 22 carbon atoms, also have a linear or branched, saturated or unsaturated, aliphatic or aromatic hydrocarbon residue $R^2$ with 1 to 30 carbon atoms, where n stands for values between 1 and 90, preferably for values between 10 and 80, and particularly for values between 20 and 60. Surfactants of the above formula are particularly preferred in which $R^1$ stands for $C_7$ to $C_{13}$, n stands for a whole natural number from 16 to 28, and $R^2$ stands for $C_8$ to $C_{12}$.

Surfactants of the formula $R^1O[CH_2CH(CH_3)O]_x[CH_2CH_2O]_yCH_2CH(OH)R^2$ are especially preferred in which $R^1$ stands for a linear or branched aliphatic hydrocarbon residue with 4 to 18 carbon atoms or mixtures thereof, $R^2$ stands for a linear or branched hydrocarbon residue with 2 to 26 carbon atoms or mixtures thereof, x stands for values between 0.5 and 1.5, and y stands for a value of at least 15. The group of these nonionic surfactants includes the $C_{2-26}$ fatty alcohol $(PO)_1-(EO)_{15-40}$-2-hydroxyalkyl ethers, particularly including the $C_{8-10}$ fatty alcohol $(PO)_1-(EO)_{22}$-2-hydroxydecyl ethers.

Furthermore, such end-capped poly(alkoxylated) nonionic surfactants of the formula $R^1O[CH_2CH_2O]_x[CH_2CH(R^3)O]_yCH_2CH(OH)R^2$ are especially preferred in which $R^1$ and $R^2$, independently of one another, stand for a linear or branched, saturated or mono- or polyunsaturated hydrocarbon residue with 2 to 26 carbon atoms, $R^3$, independently of one another, is selected from among $—CH_3$, $—CH_2CH_3$, $—CH_2CH_2—CH_3$, $—CH(CH_3)_2$ but preferably stands for $—CH_3$, and x and y, independently of one another, stand for values between 1 and 32, with nonionic surfactants in which $R^3$=$—CH_3$ and having values for x from 15 to 32 and for y of 0.5 and 1.5 being very especially preferred.

Additional nonionic surfactants that can be preferably used are the end-capped poly(alkoxylated) nonionic surfactants of the formula $R^1O[CH_2CH(R^3)O]_x[CH_2]_kCH(OH)[CH_2]_jOR^2$, in which $R^1$ and $R^2$ stand for linear or branched, saturated or unsaturated, aliphatic or aromatic hydrocarbon residues with 1 to 30 carbon atoms, $R^3$ stands for H or a methyl-, ethyl-, n-propyl-, iso-propyl-, n-butyl-, 2-butyl- or 2-methyl-2-butyl residue, x stands for values between 1 and 30, and k and j stand for values between 1 and 12, preferably between and 5. If the value is x>2, every $R^3$ in the above formula $R^1O[CH_2CH(R^3)O]_x[CH_2]_kCH(OH)[CH_2]_jOR^2$ can be different. $R^1$ and $R^2$ are preferably linear or branched, saturated or unsaturated, aliphatic or aromatic hydrocarbon residues with 6 to 22 carbon atoms, with residues with 8 to 18 C atoms being especially preferred. For the residue $R^3$, H, $—CH_3$ or $—CH_2CH_3$ are especially preferred. Especially preferred values for x lie in the range from 1 to 20, particularly from 6 to 15.

As described above, every $R^3$ in the above formula can be different if x>2. In this way, the alkylene oxide unit in the square brackets can be varied. For example, if x stands for 3, the residue $R^3$ can be selected in order to form ethylene oxide ($R^3$=H) or propylene oxide ($R^3$=$CH_3$) units, which can be joined together in any sequence—for example (EO)(PO)(EO), (EO)(EO)(PO), (EO)(EO)(EO), (PO)(EO)(PO), (PO)(PO)(EO), and (PO)(PO)(PO). The value 3 has been selected here for the sake of example and can by all means be greater, in which case the range of variation increases as the values for x increase and includes a large number of (EO) groups combined with a small number of (PO) groups, for example, or vice versa.

Especially preferred end-capped poly(alkoxylated) alcohols of the above formula have values of k=1 and j=1, so that the previous formula is simplified to $R^1O[CH_2CH(R^3)O]_xCH_2CH(OH)CH_2OR^2$. In the latter-mentioned formula, $R^1$, $R^2$, and $R^3$ are as defined above and x stands for numbers from 1 to 30, preferably from 1 to 20, and particularly from 6 to 18. Surfactants are especially preferred in which the residues $R^1$ and $R^2$ have 9 to 14 C atoms, $R^3$ stands for H, and x assumes values from 6 to 15. Ultimately, the nonionic surfactants of the general formula $R^1$—CH(OH)$CH_2O$-$(AO)_w$—$R^2$ have proven to be especially effective, in which

- $R^1$ stands for a straight-chain or branched, saturated or mono- or polyunsaturated $C_{6-24}$ alkyl or alkenyl residue;
- $R^2$ stands for a linear or branched hydrocarbon residue with 2 to 26 carbon atoms;
- A stands for a residue from the group of $CH_2CH_2$, $CH_2CH_2CH_2$, $CH_2CH(CH_3)$, preferably for $CH_2CH_2$; and
- w stands for values between 1 and 120, preferably 10 to 80, particularly 20 to 40.

The group of these nonionic surfactants includes, for example, the $C_{4-22}$ fatty alcohol-$(EO)_{10-80}$-2-hydroxyalkyl ethers, particularly including the $C_{8-12}$ fatty alcohol-$(EO)_{22}$-2-hydroxydecyl ethers and the $C_{4-22}$ fatty alcohol-$(EO)_{40-80}$-2-hydroxyalkyl ethers.

Preferably, the at least one first and/or the at least one second phase contains at least one nonionic surfactant, preferably a nonionic surfactant from the group of the Hydroxy Mixed Ethers, with the proportion by weight of the Hydroxy Mixed Ether in the total weight of the second phase being preferably 0.5 wt % to 30 wt %, preferably 5 wt % to 25 wt %, and particularly 10 wt % to 20 wt %.

In another preferred embodiment, the nonionic surfactant of the first and/or second phase is selected from nonionic surfactants of the general formula $R^1$—$O(CH_2CH_2O)_xCR^3R^4(OCH_2CH_2)_yO$—$R^2$, in which $R^1$ and $R^2$, independently of one another, stand for an alkyl residue or alkylenyl residue with 4 to 22 carbon atoms; $R^3$ and $R^4$, independently of one another, stand for H or for an alkyl residue or alkenyl residue with 1 to 18 carbon atoms, and x and y, independently of one another, stand for values between 1 and 40.

Compounds of the general formula $R^1$—$O(CH_2CH_2O)_xCR^3R^4(OCH_2CH_2)_yO$—$R^2$ are preferred in which $R^3$ and $R^4$ stand for H and the indices x and y, independently of one another, assume values from 1 to 40, preferably from 1 to 15. In particular, compounds of the general formula $R^1$—$O(CH_2CH_2O)_xCR^3R^4(OCH_2CH_2)_yO$—$R^2$ are especially preferred in which the residues $R^1$ and $R^2$, independently of one another, represent saturated alkyl residues with 4 to 14 carbon atoms and the indices x and y, independently of one another, assume values from 1 to 15 and particularly from 1 to 12. In addition, such compounds of the general formula $R^1$—$O(CH_2CH_2O)_xCR^3R^4(OCH_2CH_2)_yO$—$R^2$ are preferred in which one of the residues $R^1$ and $R^2$ is branched. Compounds of the general formula $R^1$—$O(CH_2CH_2O)_xCR^3R^4(OCH_2CH_2)_yO$—$R^2$ are very especially preferred in which the indices x and y, independently of one another, assume values from 8 to 12.

The indicated C chain lengths and degrees of ethoxylation and degrees of alkoxylation of the nonionic surfactants represent statistical averages that can be a whole number or a fraction for a given product. Owing to the manufacturing methods, commercial products of the abovementioned formulas generally do not consist of an individual representative, but of mixtures, for which reason average values and, resulting from those, fractional numbers can arise both for the C chain lengths and for the degrees of ethoxylation and degrees of alkoxylation.

As will readily be understood, the aforementioned nonionic surfactants (niosurfactants) can be used not only as individual substances but also as surfactant mixtures of two, three, four, or more surfactants.

In the at least one first phase, those nonionic surfactants are particularly preferred which have a melting point above room temperature. Nonionic surfactant(s) with a melting point above 20° C., preferably above 25° C., especially preferably between 25 and 60° C., and particularly between 26.6 and 43.3° C. is/are especially preferred.

Suitable nonionic surfactants having melting or softening points in the abovementioned temperature range include low-foaming nonionic surfactants, for example, which can be solid or highly viscous at room temperature. If nonionic surfactants are used which are highly viscous at room temperature, then it is preferred that they have a viscosity above 20 Pa·s, preferably above 35 Pa·s, and particularly above 40 Pa·s. Nonionic surfactants that have a wax-like consistency at room temperature are also preferred.

The nonionic surfactant that is solid at room temperature preferably has propylene oxide (PO) units in the molecule. Preferably, such PO units constitute up to 25 wt %, especially preferably up to 20 wt %, and particularly up to 15 wt % of the total molar mass of the nonionic surfactant. Especially preferred nonionic surfactants are ethoxylated monohydroxy alkanols or alkyl phenols that additionally have polyoxyethylene-polyoxypropylene block copolymer units. The alcohol or alkyl phenol fraction of such nonionic surfactant molecules preferably constitutes greater than 30 wt %, especially preferably greater than 50 wt %, and particularly greater than 70 wt % of the total molar mass of such nonionic surfactants. Preferred agents are wherein they contain ethoxylated and propoxylated nonionic surfactants in which the propylene oxide units in the molecule constitute up to 25 wt %, preferably up to 20 wt %, and particularly up to 15 wt % of the total molar mass of the nonionic surfactant.

Additional especially preferred nonionic surfactants to be used in the first phase with melting points above room temperature contain 40 to 70% of a polyoxypropylene/polyoxyethylene/polyoxypropylene block polymer blend that contains 75 wt % of a reverse block copolymer of polyoxyethylene and polyoxypropylene with 17 mols of ethylene oxide and 44 mols of propylene oxide and 25 wt % of a block copolymer of polyoxyethylene and polyoxypropylene, initiated with trimethylolpropane and containing 24 mols of ethylene oxide and 99 mols of propylene oxide per mol of trimethylolpropane.

In one preferred embodiment, the proportion by weight of the nonionic surfactant with respect to the total weight of the first phase is 0.1 to 20 wt %, especially preferably 0.5 to 15 wt %, and particularly 2.5 to 10 wt %.

All anionic surface-active substances are suitable for use as anionic surfactants in the dishwashing detergents. These are characterized by a water-solubilizing, anionic group such as a carboxylate, sulfate, sulfonate or phosphate group and a lipophilic alkyl group with about 8 to 30 C atoms. In addition, glycol or polyglycol ether groups, ester, ether and amide groups as well as hydroxyl groups can be contained in the molecule. Suitable anionic surfactants are preferably present in the form of the sodium, potassium and ammonium as well as the mono-, di- and trialkanol ammonium salts with 2 to 4 C atoms in the alkanol group, but zinc, manganese(II), magnesium, calcium, or mixtures thereof can also be used as the counterion.

Preferred anionic surfactants are alkyl sulfates, alkyl polyglycol ether sulfates, and ether carboxylic acids with 10 to 18 C atoms in the alkyl group and up to 12 glycol ether groups in the molecule.

Instead of the abovementioned surfactants or in conjunction with them, cationic and/or amphoteric surfactants such as betaines or quaternary ammonium compounds can also be used. It is preferred, however, that no cationic and/or amphoteric surfactants be used.

Surfactants influence the opacity of the second phase. In a likewise preferred, different embodiment, the second phase is therefore free of surfactants, particularly of nonionic surfactants.

Preferred detergent or cleaning agents according to the invention are also wherein, in the at least one first and/or the at least one second phase, particularly in the first phase, they contain less than 1.0 wt % and particularly no anionic surfactant, since the addition of anionic surfactants has proven disadvantageous with respect to the phase characteristics, particularly the hardness, friability (wearing characteristics), and resetting characteristics.

Substances that are also used as ingredients of cosmetic agents are also designated in the following according to the International Nomenclature of Cosmetic Ingredients (INCI) as appropriate. Chemical compounds bear an INCI designation in English. The INCI designations can be found in the "International Cosmetic ingredient Dictionary and Handbook, 7th Edition (1997)," which is published by The Cosmetic, Toiletry and Fragrance Association (CTFA), Washington D.C. (USA). The expression CAS means that the following numerical sequence is a designation of the Chemical Abstracts Service.

Besides the surfactants, the at least one second phase can also contain sugars. According to the invention, sugars include monosaccharides, disaccharides, and oligosaccharides. Preferably, the second phase comprises disaccharides, particularly sucrose. The sucrose fraction is 0 wt % to 30 wt %, particularly 5 wt % to 25 wt %, especially preferably 10 wt % to 20 wt %, with respect to the weight of the second phase. In greater quantities, the sugar does not dissolve completely in the second phase and results in the clouding thereof. Through the use of sugar, particularly in a proportion of 10 wt % to 15 wt %, the development of moisture is reduced and the adhesion to the at least one first phase thus improved.

The use of builder substances (builders) such as silicates, aluminum silicates (particularly zeolites), salts of organic di- and polycarboxylic acids, as well as mixtures of these substances, preferably water-soluble builder substances, can be advantageous.

In an embodiment that is preferred according to the invention, the use of phosphates (including polyphosphates) is omitted either largely or completely. In this embodiment, the agent preferably contains less than 5 wt %, especially preferably less than 3 wt %, particularly less than 1 wt % phosphate(s). Especially preferably, the agent in this embodiment is completely phosphate-free, i.e., the agents contain less than 0.1 wt % phosphate(s).

The builders include, in particular, carbonates, citrates, phosphonates, organic builders, and silicates. The proportion by weight of the total builders with respect to the total weight of agents according to the invention is preferably 15 to 80 wt % and particularly 20 to 70 wt %.

Some examples of organic builders that are suitable according to the invention are the polycarboxylic acids (poilycarboxylates) that can be used in the form of their sodium salts, with polycarboxylic acids being understood as being those carboxylic acids that carry more than one, particularly two to eight acid functions, preferably two to six, particularly two, three, four, or five acid functions in the entire molecule. As polycarboxylic acids, dicarboxylic acids, tricarboxylic acids, tetracarboxylic acids, and pentacarboxylic acids, particularly di-, tri-, and tetracarboxylic acids, are thus preferred. The polycarboxylic acids can also carry additional functional groups such as hydroxyl or amino groups, for example. For example, these include citric acid, adipic acid, succinic acid, glutaric acid, malic acid, tartaric acid, maleic acid, fumaric acid, sugar acids (preferably aldaric acids, for example galactaric acid and glucaric acid), aminocarboxylic acid, particularly aminodicarboxylic acids, aminotricarboxylic acids, aminotetracarboxylic acids such as, for example, nitrilotriacetic acid (NTA), glutamic-N,N-diacetic acid (also called N,N-bis(carboxymethyl)-L-glutamic acid or GLDA), methyl glycine diacetic acid (MGDA) and derivatives thereof and mixtures thereof. Preferred salts are the salts of the polycarboxylic acids such as citric acid, adipic acid, succinic acid, glutaric acid, tartaric acid, GLDA, MGDA, and mixtures thereof.

Other substances that are suitable as organic builders are polymeric polycarboxylates (organic polymers with a plurality of (particularly greater than ten) carboxylate functions in the macromolecule), polyaspartates, polyacetals, and dextrins.

Besides their building effect, the free acids also typically have the quality of an acidifying component. Particularly noteworthy here are citric acid, succinic acid, glutaric acid, adipic acid, gluconic acid, and any and all mixtures thereof.

Especially preferred detergents or cleaning agents according to the invention, particularly dishwashing detergents, preferably dishwashing detergents for dishwashers, contain one or more salts of the citric acid, i.e., citrates, as one of their essential builders. These are preferably contained in a proportion of 2 to 40 wt %, particularly 5 to 30 wt %, especially 7 to 28 wt %, especially preferably 10 to 25 wt %, very especially preferably 15 to 20 wt %, each with respect to the total weight of the agent.

It is also especially preferred to use carbonate(s) and/or hydrogen carbonate(s), preferably alkali carbonate(s), especially preferably sodium carbonate (soda), in quantities of 2 to 50, preferably 4 to 40 wt %, and particularly 10 to 30 wt %, very especially preferably 10 to 24 wt %, each with respect to the weight of the agent.

Especially preferred detergents or cleaning agents according to the invention, particularly dishwashing detergents, preferably dishwashing detergents for dishwashers, are wherein they contain at least two builders from the group of the silicates, phosphonates, carbonates, aminocarboxylic acids, and citrates, with the proportion by weight of these builders with respect to the total weight of the cleaning agent according to the invention being preferably 5 to 70 wt %, more preferably 15 to 60 wt %, and particularly 20 to 50 wt %. The combination of two or more builders from the abovementioned group has proven advantageous for the cleaning and rinsing of detergents or cleaning agents according to the invention, particularly dishwashing detergents, preferably dishwashing detergents for dishwashers. Beyond the builders mentioned here, one or more other builders can be additionally contained.

Preferred detergents or cleaning agents, preferably dishwashing detergents, preferably dishwashing detergents for dishwashers, are characterized by a builder combination of citrate and carbonate and/or hydrogen carbonate. In one embodiment that is very especially preferred according to the invention, a mixture of carbonate and citrate is used in which the quantity of carbonate is preferably 5 to 40 wt %, particularly 10 to 25 wt %, and the quantity of citrate is preferably 5 to 35 wt %, particularly 10 to 25 wt %, very especially preferably 15 to 20 wt %, each with respect to the total quantity of the cleaning agent, with the total quantity of these two builders preferably being 20 to 65 wt %, particularly 25 to 60 wt %, more preferably 30 to 50 wt %. Moreover, one or more other builders can be additionally contained.

The detergents or cleaning agents according to the invention, particularly dishwashing detergents, preferably dishwashing detergents for dishwashers, can contain phosphonates in particular as an additional builder. A hydroxy alkane and/or amino alkane phosphonate is preferably used as a phosphonate compound. Among the hydroxy alkane phosphonates, 1-hydroxyethane-1,1-diphosphonate (HEDP) has special significance. Ethylenediamine tetramethylene phosphonate (EDTMP), diethylenetriamine pentamethylene phosphonate (DTPMP) and higher homologs thereof are preferably considered. Phosphonates are preferably contained in the agents according to the invention in quantities from 0.1 to 10 wt %, particularly in quantities from 0.5 to 8 wt %, very especially preferably from 2.5 to 7.5 wt %, each with respect to the total weight of the agent.

The combined use of citrate, (hydrogen) carbonate, and phosphonate is especially preferred. These can be used in the abovementioned quantities. In particular, quantities of 10 to 25 wt % citrate, 10 to 30 wt % carbonate (or hydrogen carbonate), and 2.5 to 7.5 wt % phosphonate are used, each with respect to the total weight of the agent.

Additional especially preferred detergents or cleaning agents, particularly dishwashing detergents, preferably dishwashing detergents for dishwashers, are wherein, in addition to citrate and (hydrogen) carbonate and, optionally, phosphonate, they contain an additional phosphorous-free builder. In particular, it is selected from among the aminocarboxylic acids, with the additional phosphorous-free builder preferably being selected from among methyl glycine diacetic acid (MGDA), glutamic acid diacetate (GLDA), aspartic acid diacetate (ASDA), hydroxyethyliminodiacetate (HEIDA), iminodisuccinate (IDS), and ethylenediamine disuccinate (EDDS), especially preferably from among MGDA or GLDA. An example of an especially preferred combination is citrate, (hydrogen) carbonate, and MGDA as well as, optionally, phosphonate.

The proportion by weight of the additional phosphorous-free builder, particularly of the MGDA and/or GLDA, is preferably 0 to 40 wt %, particularly 5 to 30 wt %, especially 7 to 25 wt %. The use of MGDA or GLDA, particularly MGDA, as a granulate is especially preferred. Advantageous in this regard are MGDA granulates that contain as little water as possible and/or have a lower hygroscopicity (water absorption at 25° C., normal pressure) than non-granulated powders. The combination of at least three, particularly at least four builders from the abovementioned group has proven advantageous for the cleaning and rinsing of cleaning agents according to the invention, particularly dishwashing detergents, preferably dishwashing detergents for dishwashers. Besides those, additional builders can also be contained.

Polymeric polycarboxylates are still suitable as organic builders; these include the alkali metal salts of polyacrylic acid or of polymethacrylic acid, for example those having a relative molecular mass of 500 to 70,000 g/mol. Suitable polymers are particularly polyacrylates, which preferably have a molecular mass from 1,000 to 20,000 g/mol. Due to their superior solubility, the short-chain polyacrylates, which have molar masses from 1,100 to 10,000 g/mol, and especially preferably from 1,200 to 5,000 g/mol, can be preferred from this group.

The (homo)polymeric polycarboxylates contained in the detergents or cleaning agents according to the invention, particularly dishwashing detergents, particularly dishwashing detergents for dishwashers, is preferably 0.5 to 20 wt %, more preferably 2 to 15 wt %, and particularly 4 to 10 wt %.

Detergents or cleaning agents according to the invention, particularly dishwashing detergents, particularly dishwashing detergents for dishwashers, can also contain, as a builder, crystalline layered silicates of the general formula $NaMSi_xO_{2x+1}\cdot y\ H_2O$, where M represents sodium or hydrogen, x is a number from 1.9 to 22, preferably from 1.9 to 4, with 2, 3, or 4 being especially preferred values for x, and y stands for a number from 0 to 33, preferably from 0 to 20. Amorphous sodium silicates with an $Na_2O:SiO_2$ modulus of 1:2 to 1:3.3, preferably 1:2 to 1:2.8, and particularly 1:2 to 1:2.6 can also be used which preferably have retarded dissolution and secondary washing properties.

In certain detergents or cleaning agents according to the invention, particularly dishwashing detergents, particularly dishwashing detergents for dishwashers, the silicate content in relation to the total weight of the detergent or cleaning agent is limited to quantities below 10 wt %, preferably below 5 wt %, and particularly below 2 wt %.

In supplementation to the aforementioned builders, the detergents or cleaning agents according to the invention can also contain alkali metal hydroxides. These alkali carriers are preferably used in the detergents or cleaning agents and particularly in the at least one second phase only in small quantities, preferably in quantities below 10 wt %, preferably below 6 wt %, more preferably below 5 wt %, especially preferably between 0.1 and 5 wt %, and particularly between 0.5 and 5 wt %, each with respect to the total weight of the detergent or cleaning agent. Alternative detergents or cleaning agents according to the invention are free of alkali metal hydroxides.

As an additional component, cleaning agents according to the invention preferably contain enzyme(s) in the at least one first and/or second phase. These include, in particular, proteases, amylases, lipases, hemicellulases, cellulases, perhydrolases, or oxidoreductases, as well as, preferably, mixtures thereof. In principle, these enzymes are of natural origin; starting from the natural molecules, improved variants for use in cleaning agents are available which are preferably used accordingly. Cleaning agents according to the invention preferably contain enzymes in total quantities from $1\times10^{-6}$ wt % to 5 wt % with respect to active protein. The protein concentration can be determined with the aid of known methods, for example the BCA method or the Biuret method.

Among the proteases, the subtilisin-type proteases are preferred. Examples of these are the subtilisins BPN' and Carlsberg, as well as the further-developed forms thereof, protease PB92, subtilisins 147 and 309, the alkaline protease from *Bacillus lentus*, subtilisin DY, but not the enzymes thermitase, proteinase K and proteases TW3 and TW7, which belong to the subtilases but no longer to the subtilisins in the narrower sense.

Examples of amylases that can be used according to the invention are α-amylases from *Bacillus licheniformis*, from *B. amyloliquefaciens*, from *B. stearothermophilus*, from *Aspergillus niger*, and *A. oryzae*, as well as the further developments of the abovementioned amylases that have been improved for use in cleaning agents. Others that are particularly noteworthy for this purpose are the α-amylases from *Bacillus sp.* A 7-7 (DSM 12368) and cyclodextrin glucanotransferase (CGTase) from *B. agaradherens* (DSM 9948).

Furthermore, lipases or cutinases can be used according to the invention, particularly due to their triglyceride-cleaving activities, but also in order to produce peracids in situ from suitable precursors. These include, for example, the lipases that could originally be obtained from *Humicola lanuginosa* (*Thermomyces lanuginosus*) and those that have been further developed, particularly those with the amino acid exchange in positions D96LT213R and/or N233R, especially preferably all of the exchanges D96L, T213R, and N233R.

Moreover, enzymes can be used which can be grouped together under the term "hemicellulases." These include, for example, mannanases, xanthan lyases, pectin lyases (=pectinases), pectinesterases, pectate lyases, xyloglucanases (=xylases), pullulanases, and β-glucanases.

In order to increase the bleaching effect, oxidoreductases such as oxidases, oxygenases, catalases, peroxidases such as halo-, chloro-, bromo-, lignin, glucose, or manganese peroxidases, dioxygenases or laccases (phenoloxidases, polyphenoloxidases) can be employed according to the invention. Advantageously, organic, especially preferably aromatic compounds that interact with the enzymes are additionally added in order to potentiate the activity of the relevant oxidoreductases (enhancers) or, in the event of greatly differing redox potentials, to ensure the flow of electrons between the oxidizing enzymes and the contaminants (mediators). A protein and/or enzyme can be protected, especially during storage, against damage, for example in the form inactivation, denaturing, or decomposition caused, for example, by physical influences, oxidation, or proteolytic cleavage. When the proteins and/or enzymes are obtained microbially, it is especially preferred that proteolysis be inhibited, particularly if the agents also contain proteases. To this end, cleaning agents can contain stabilizers; the provision of such agents constitutes a preferred embodiment of the present invention.

Proteases and amylases that are active in detergency are generally not made available in the form of the pure protein, but rather in the form of stabilized, storable and transportable preparations. These ready-made preparations include, for example, the solid preparations obtained through granulation, extrusion, or lyophilization or, particularly in the case of liquid of gel-type agents, solutions of the enzymes, advantageously maximally concentrated, low-moisture, and/or supplemented with stabilizers or other adjuvants.

Alternatively the enzymes can also be encapsulated for the at least one first and/or the at least one second phase, for example through spray-drying or extrusion of the enzyme solution together with a preferably natural polymer or in the form of capsules, for example those in which the enzymes are enclosed in a set gel, or in those of the core-shell type in which an enzyme-containing core is coated with a water-, air-, and/or chemical-impermeable protective layer. In the case of overlaid layers, other active substances, such as stabilizers, emulsifiers, pigments, bleaching agents, or dyes, can be additionally applied. Such capsules are applied using inherently known methods, for example through shaking or roll granulation or in fluidized bed processes. Such granulates are advantageously low in dust, for example due to the application of polymeric film-formers, and stable in storage due to the coating.

Moreover, it is possible to formulate two or more enzymes together, so that a single granulate has several enzyme activities.

As can be seen from the preceding remarks, the enzyme protein forms only a fraction of the total weight of conventional enzyme preparations. Protease and amylase preparations that are preferably used according to the invention contain between 0.1 and 40 wt %, preferably between 0.2 and 30 wt %, especially preferably between 0.4 and 20 wt %, and particularly between 0.8 and 10 wt % of the enzyme protein. In particular, those cleaning agents are preferred which contain, with respect to their total weight, 0.1 to 12 wt %, preferably 0.2 to 10 wt %, and particularly 0.5 to 10 wt % of the respective enzyme preparation.

Besides to the components cited in the foregoing, the at least one first and/or the at least one second phase of the detergent or cleaning agent according to the invention can contain additional ingredients. For example, these include anionic, cationic, and/or amphoteric surfactants, bleaching agents, bleach activators, bleach catalysts, other solvents, thickeners, sequestering agents, electrolytes, corrosion inhibitors, particularly silver anti-tarnishing agents, glass corrosion inhibitors, foam inhibitors, dyes, aromas (particularly in the at least one phase), additives for improving the flow and drying behavior, for adjusting the viscosity, for stabilization, UV stabilizers, Perglanzmittel (INCI Opacifying Agents; for example, glycol distearate, such as Cutina® AGS by Cognis, or mixtures containing same, such as Euperlane® by Cognis), preservatives (for example, the technical preservative 2-bromo-2-nitropropane-1,3-diol, which is also known as Bronopol (CAS 52-51-7) and is commercially available as Myacide® BT or as Boots Bronopol BT from the Boots company), antimicrobial agents (disinfectants), and pH adjusters in quantities of usually no more than 5 wt %.

Agents according to the invention preferably contain at least one alkanolamine as an additional solvent. The alkanolamine is preferably selected from the group consisting of mono-, di-, triethanol- and propanolamine and mixtures thereof. The alkanolamine is preferably contained in agents according to the invention in a quantity of 0.5 to 10 wt %, particularly in a quantity of 1 to 6 wt %. In a preferred detergent or cleaning agent, the at least one second phase is free of alkanolamine, and the alkanolamine is contained only in the at least one first phase.

In a preferred embodiment, detergents or cleaning agents according to the invention, particularly dishwashing detergents, contain, as an additional component, at least one zinc salt as a glass corrosion inhibitor. The zinc salt can be an inorganic or organic zinc salt. The zinc salt to be used according to the invention preferably has a solubility in water of greater than 100 mg/l, preferably greater than 500 mg/l, especially preferably greater than 1 g/l, and particularly greater than 5 g/l (all solubilities at 20° C. water temperature). The inorganic zinc salt is preferably selected from the group consisting of zinc bromide, zinc chloride, zinc iodide, zinc nitrate, and zinc sulfate. The organic zinc salt is preferably selected from the group consisting of zinc salts of monomeric or polymeric organic acids, particularly from the group of zinc acetate, zinc acetyl acetonate, zinc benzoate, zinc formiate, zinc lactate, zinc gluconate, zinc ricinoleate, zinc abietate, zinc valerate, and zinc-p-toluene sulfonate. In an embodiment that is especially preferred according to the invention, zinc acetate is used as a zinc salt. The zinc salt is preferably contained in cleaning agents according to the invention in a quantity of 0.01 wt % to 5 wt %, especially preferably in a quantity of 0.05 wt % to 3 wt %, particularly in a quantity of 0.1 wt % to 2 wt %, with respect to the total weight of the cleaning agent. In addition or alternatively to the abovementioned salts (particularly the zinc salts), polyethylenimines such as those which are available under the name Lupasol® (BASF) are preferably used as glass corrosion inhibitors in a quantity of 0 to 5 wt %, particularly 0.01 to 2 wt %.

Polymers that are suitable as additives are particularly maleic acid acrylic acid copolymer Na salt (for example, Sokalan® CP 5 by BASF, Ludwigshafen (Germany)), modified polyacrylic acid Na salt (for example, Sokalan® CP 10 by BASF, Ludwigshafen (Germany)), modified polycarboxylate Na salt (for example, Sokalan® HP 25 by BASF, Ludwigshafen (Germany)), polyalkylene oxide, modified heptamethyltrisiloxane (for example, Silwet® L-77 by BASF, Ludwigshafen (Germany)), polyalkylene oxide, modified heptamethyltrisiloxane (for example, Silwet® L-7608 by BASF, Ludwigshafen (Germany)), as well as polyethersiloxane (copolymers of polymethyl siloxanes with ethylene oxide/propylene oxide segments (polyether blocks)), preferably water-soluble, linear polyether siloxanes with terminal polyether blocks, such as Tegopren® 5840, Tegopren® 5843, Tegopren® 5847, Tegopren® 5851, Tegopren® 5863, or Tegopren® 5878 by Evonik, Essen (Germany). Builder substances that are suitable as additives are particularly polyaspartic acid Na salt, ethylenediamine triacetate cocoalkyl acetamide (for example, Rewopol® CHT 12 by Evonik, Essen (Germany)), methyl glycine diacetic acid tri-Na salt, and acetophosphonic acid. In the case of Tegopren® 5843 and Tegopren® 5863, mixtures with surface-active or polymeric additives exhibit synergisms. However, the use of Tegopren types 5843 and 5863 on hard surfaces made of glass, particularly glass dishes, is less preferred, since these silicone surfactants can adhere to glass. In a special embodiment of the invention, the abovementioned additives are omitted.

A preferred detergent or cleaning agent, particularly dishwashing detergent, preferably also comprises a bleaching agent, particularly an oxygen bleaching agent, as well as, optionally, a bleach activator and/or bleach catalyst. Insofar as they are present, they are contained exclusively in the first phase.

As a preferred bleaching agent, cleaning agents according to the invention contain an oxygen bleaching agent from the group of sodium percarbonate, sodium perborate tetrahydrate, and sodium perborate monohydrate. Some other examples of bleaching agents that can be used are peroxypyrophosphates, citrate perhydrates, and $H_2O_2$-yielding peracidic salts or peracids, such as perbenzoates, peroxophthalates, diperazelaic acid, phthaloimino peracid, or diperdodecane diacid. Moreover, bleaching agents from the group of the organic bleaching agents can also be used. Typical organic bleaching agents are the diacyl peroxides, such as dibenzoyl peroxide, for example. Other typical organic bleaching agents are the peroxy acids, with the alkylperoxy acids and the arylperoxy acids meriting special mention as examples. Due to its good bleaching performance, sodium percarbonate is especially preferred. One especially preferred oxygen bleaching agent is sodium percarbonate.

Compounds which, under perhydrolysis conditions, yield aliphatic peroxocarboxylic acids with preferably 1 to 10 C atoms, particularly 2 to 4 C atoms, and/or optionally substituted perbenzoic acid, can be used as bleach activators. Substances that carry the O- and/or N-acyl group of the cited number of C atoms and/or optionally substituted benzoyl groups are suitable. Multiply acylated alkylene diamines are preferred, with tetraacetylethyl ethylenediamine (TAED) having proven to be especially suitable.

The bleach catalysts are bleach-boosting transition metal salts or transition metal complexes such as, for example, Mn-, Fe-, Co-, Ru-, or Mo-salene complexes or -carbonyl complexes. Mn-, Fe-, Co-, Ru-, Mo-, Ti-, V-, and Cu-complexes with N-containing tripod ligands as well as Co-, Fe- Cu-, and Ru-ammine complexes can be used as bleach catalysts. Complexes of manganese in oxidation stage II, III, IV, or IV are especially preferably used which preferably contain one or more macrocyclic ligands with the donor functions N, NR, PR, O and/or S. Preferably, ligands are used which have nitrogen donor functions. It is especially preferred to use bleach catalyst or catalysis in the agents according to the invention which contains or contain, as a macromolecular ligand, 1,4,7-trimethyl-1,4,7-triazacyclononane (Me-TACN), 1,4,7-triazacyclononane (TACN), 1,5,9-trimethyl-1,5,9-triazacyclododecane (Me-TACD), 2-methyl-1-1,4,7-trimethyl-1,4, 7-triazacyclononane (Me/Me-TACN), and/or 2-methyl-1,4,7-triazacyclononane (Me/TACN). Some examples of suitable manganese complexes are $[Mn^{III}_2(\mu\text{-O})1(\mu\text{-OAc})_2(TACN)_2](ClO_4)_2$, $[Mn^{III}Mn^{IV}(\mu\text{-O})_2(\mu\text{-OAc})_1(TACN)_2](BPh_4)_2$, $[Mn^{IV}_4(\mu\text{-O})_6(TACN)_4](ClO_4)_4$, $[Mn^{III}_2(\mu\text{-O})_1(\mu\text{-OAc})_2(Me\text{-}TACN)_2](ClO_4)_2$, $[Mn^{III}Mn^{IV}(\mu\text{-O})_1(\mu\text{-OAc})_2(Me\text{-}TACN)_2](ClO_4)_3$, $[Mn^{IV}_2(\mu\text{-O})_3(Me\text{-}TACN)_2](PFs)_2$, and $[Mn^{IV}_2(\mu\text{-O})_3(Me/Me\text{-}TACN)_2](PFs)_2$(where OAc=OC(O)$CH_3$).

When benzoic acid, salicylic acid, or lactic acid are used as pH regulators and/or buffer substances, these compounds can support or boost the antibacterial effect of the silver and/or of the silver compound.

The detergent or cleaning agent according to the invention comprises at least one first phase (1) and at least one second phase (2). The detergent or cleaning agent can thus have one, two, three, or more mutually different first phases (1); likeside, it can have one, two, three, or more mutually different second phases (2). Preferably, the detergent or cleaning agent according to the invention comprises one first phase (1) and one second phase (2). Especially preferably, the detergent or cleaning agent comprises two first phases (1) and one second phase (2). Preferably, it comprises two first phases (1) and two second phases (2). An embodiment is also preferred in which the detergent or cleaning agent comprises three first phases (1) and one or two second phases (2). The weight ratio of the at least one first phase (1) to the at least one second phase (2) is preferably 20:1 to 8:1. The total weight of phase (1) in a cleaning agent portion can be between 8 and 30 g, particularly 10 to 25 g, preferably 12 to 21 g, for example 14 to 19 g. This weight ratio provides a good concentration of the respective ingredients of the first (1) and second phase (2) in a cleaning procedure.

According to the invention, the at least one first phase (1) and the at least one second phase (2) are adjacent to one another over all or part of their surfaces. It is preferred in this regard that the two phases be immediately adjacent. It is possible, however, for the at least one first phase (1) or the at least one second phase (2) or the at least one first phase (1) and the at least one second phase (2) to be enclosed in a water-soluble film or contained in a water-soluble pouch. Preferably, the entire agent is contained in a water-soluble pouch or, especially preferably, enclosed by a water-soluble film.

If the at least one first phase (1) and the at least one second phase (2) are directly adjacent to one another over all or part of their surfaces, stability is important, as is a setting time of the at least one second phase (2) that is as short as possible. Here, stability means that components contained in the second phase do not cross over into the at least one first phase, but rather the at least one first phase and the at least one second phase remain visually separate from one another even after a long period of storage and do not interact with each other, for example through the diffusion of liquid components from one phase to the other or the reaction of components of one phase with those in the other phase, or loss of adhesion of the second phase (2) to the particularly pressed, compacted first phase (1) as a result of the leakage of liquid. Surprisingly, it was found that this can be made possible by a second phase that has glycerin, gelatin, and at least one $C_3$ to $C_5$ alkanediol.

The water-soluble film or the water-soluble pouch preferably comprises a water-soluble polymer. Some preferred water-soluble polymers that are preferably used as water-soluble packaging are polyvinyl alcohols, acetalized polyvinyl alcohols, polyvinyl pyrrolidones, polyethylene oxides, celluloses, and gelatin, with polyvinyl alcohols and acetalized polyvinyl alcohols being especially preferably used.

"Polyvinyl alcohols" (abbreviated as PVAL, and occasionally as PVOH) is the designation for polymer having the general structure

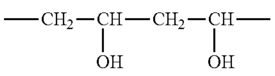

which also contain structural units in small proportions (about 2%) of the type

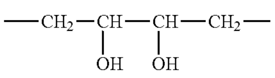

Commercially available polyvinyl alcohols, which are offered as a white-yellowish powder or granulate with degrees of polymerization in the range from about 100 to 2,500 (molar masses from about 4,000 to 100,000 g/mol) have degrees of hydrolysis of 87-99 mol %, so they still contain residual acetyl groups.

In the framework of the present invention, it is preferred if the water-soluble packaging comprises at least some proportion of polyvinyl alcohol whose degree of hydrolysis is preferably 70 to 100 mol %, particularly 80 to 90 mol %, especially preferably 81 to 89 mol %, and above all 82 to 88 mol %. In a preferred embodiment, the water-soluble packaging consists of at least 20 wt %, especially preferably at least 40 wt %, very especially preferably at least 60 wt %, and particularly at least 80 wt % of a polyvinyl alcohol whose degree of hydrolysis is 70 to 100 mol %, preferably 80 to 90 mol %, especially preferably 81 to 89 mol %, and particularly 82 to 88 mol %.

Preferably, polyvinyl alcohols are used as materials for the packaging which lie within a defined range of molecular weights, with it being preferred according to the invention that the packaging material comprise a polyvinyl alcohol whose molecular weight lies in the range from 5,000 $g \cdot mol^{-1}$ to 100,000 $g \cdot mol^{-1}$, preferably from 10,000 $g \cdot mol^{-1}$ to 90,000 $g \cdot mol^{-1}$, especially preferably from 12,000 $g \cdot mol^{-1}$ to 80,000 $g \cdot mol^{-1}$, and particularly from 15,000 $g \cdot mol^{-1}$ to 70,000 $g \cdot mol^{-1}$.

The degree of polymerization of such preferred polyvinyl alcohols is from about 200 to about 2,100, preferably from about 220 to about 1890, especially preferably between about 240 to about 1680, and particularly between about 260 to about 1500.

The water solubility of polyvinyl alcohol can be altered through post-treatment with aldehydes (acetalization) or ketones (ketalization). Especially preferred and, due to their decidedly good solubility in cold water, especially advantageous polyvinyl alcohols have been produced which can be acetalized or ketalized with the aldehyde or keto groups of saccharides or polysaccharides or mixtures thereof. It is extremely advantageous to use the reaction products from polyvinyl alcohol and starch. Furthermore, the water solubility can be altered and thus set at desired values in a targeted manner using Ni or Cu salts or through treatment with dichromates, boric acid, or borax.

The water-soluble pouch preferably has a thickness of 10 μm to 500 μm, particularly 20 μm to 400 μm, especially preferably 30 μm to 300 μm, above all 40 μm to 200 μm, particularly 50 μm to 150 μm. One polyvinyl alcohol that is especially preferably used is available under the trade name M8630 (Monosol), for example.

The water-soluble film that is preferably used in the narrow covering especially preferably comprises polyvinyl alcohol as described above, with a thickness of 10 μm to 100 μm, particularly 12 μm to 60 μm, especially preferably 15 μm to 50 μm, above all 20 μm to 40 μm, particularly 22 μm to 35 μm being preferably used as an initial thickness.

In the case of a narrow covering, a single-use portion of the detergent or cleaning agent is enclosed in each. For the covered detergents or cleaning agents according to the invention, it is important that the covering rest tightly against the entire surface of the tablets.

Ideally, the covering is even under tension, which is not absolutely necessary, however. This tight abutment of the covering is conducive to disintegration: Upon initial contact with water, the covering will allow a small quantity of water through at some place and does not have to dissolve at all initially. It is there that the disintegrant contained in the tablet begins to swell. As a result, the covering now tears open suddenly due to the increase in volume and releases the tablet. In the case of a covering that does not abut tightly, the mechanism being described here does not work, since the tablet can swell without breaking the covering open. The use of a swellable disintegration aid is superior to a gas-producing system, since its bursting effect always results in the tearing-open of the covering. In a gas-producing system, the bursting effect can "fizzle out" due to the leakage of the gas from the leak point.

Single-use portions of detergents or cleaning agents according to the invention are wherein the clearance between the single-use portion and water-soluble covering over the entire surface is 0.1 to 1000 μm, preferably 0.5 to 500 μm, especially preferably 1 to 250 μm, and particularly 2.5 to 100 μm.

In a preferred embodiment, the film covering is first placed and welded loosely around a single-use portion of detergent or cleaning agent and then shrunk onto same, thus resulting in close contact between the film packaging and the cleaning agent concentrate. Consequently, single-use portions of detergent or cleaning agent according to the invention are wherein the covering is a film packaging that is shrunk onto same.

For example, this encasement can be achieved by placing a water-soluble base film onto a transport chain or a shaping tool, upon which one or more portions of detergent or cleaning agent are placed onto the base film; a water-soluble top film is then placed onto the portion(s) of detergent or cleaning agent, and this is then fixed to the base film under the inclusion of the portion of detergent or cleaning agent. Alternatively, this step can also be performed using a single-stranded film that is then placed around the single-use portions as a tube. The films are then sealed and, optionally, cut. The film can then be shrunk through the use of hot air or infrared radiation, optionally with pressing force.

Such water-soluble coverings have also already been described in patent applications WO 2004/031338 A and WO 2003/099985 A, to the entire disclosure of which reference is hereby made.

In a preferred embodiment, the at least one first phase (1) of the detergent or cleaning agent according to the invention, particularly of the dishwashing detergent, preferably of the dishwashing detergent for dishwashers, is present in the form of a molded body, particularly a compacted body, especially a tablet. Especially preferably, the at least one first phase (1) is a powdered detergent or cleaning agent that is present in the form of a compacted tablet.

Figure 2A:
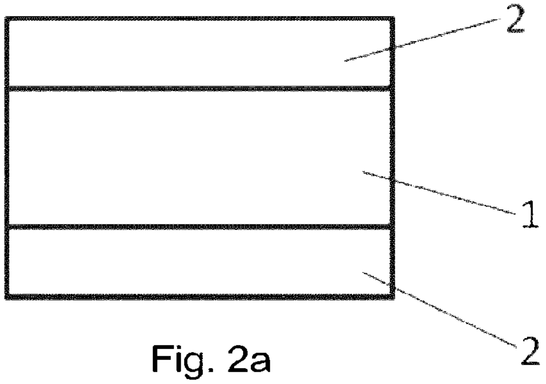
FIG. 2*a* shows a first phase (1) surrounded by a second phase (2)
Figure 2B:
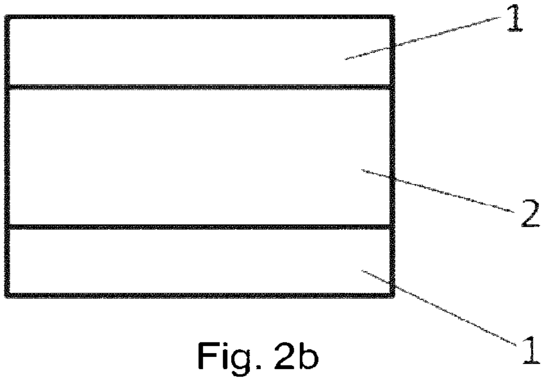
FIG. 2*b* shows a second phase (2) surrounded by a first phase (1)
Figure 3A:
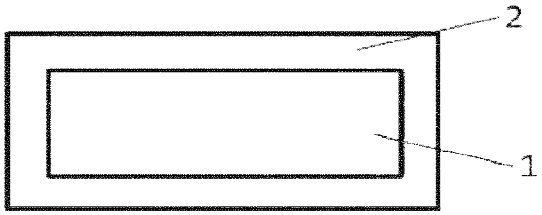
FIG. 3*a* schematically shows the embedding of a first phase (1) in a second phase (2)
Figure 3B:
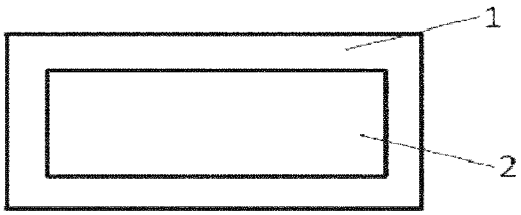
FIG. 3*b* schematically shows the embedding of a second phase (2) in a first phase (1)

Regardless of whether directly or indirectly (for example, through the presence of a film, covering, or pouch as described above), the at least one first phase (1) and the at least one second phase (2) can be arranged in any combination in relation to one another. For instance, a first phase (1) can be arranged on or next to a second phase (2), as shown schematically in FIG. 1. In this embodiment, the detergent or cleaning agent according to the invention comprises one first phase (1) and one second phase (2). It is also conceivable for a first phase (1) to be surrounded by second phases (2), or vice versa, as illustrated in FIGS. 2*a* and 2*b*. The embedding of one phase in another, as is shown schematically in FIGS. 3*a* and 3*b*, is also included by the invention. Another, especially preferred arrangement is shown schematically in FIG. 4. The second phase (2) is present in the form of a core that is embedded in the first phase (1). A pool shape of the solid first phase (1)—that is, a shape with a depression into which the second phase is introduced—is especially preferred. The depression can be round, oval-shaped, or angular. Two depressions that are separated from one another can also be present which are filled with the at least one second phase (2). In this embodiment, the detergent or cleaning agent comprises two second phases (2), and the two second phases can have different compositions.

In principle, any geometry is possible. The rectangular shape shown here is provided only for the sake of example. A round or oval shape of the two phases, or any polygonal configuration, is also conceivable.

Another object of the present application is a method for cleaning hard surfaces, particularly of dishes, in which the surface is worked in an inherently known manner using a cleaning agent according to the invention. In particular, the surface is brought into contact with the detergent or cleaning agent according to the invention. The cleaning is performed particularly using a cleaning machine, preferably a dishwasher.

Another object of the present invention is also the use of a cleaning agent for cleaning hard surfaces, particularly of dishes.

In a preferred embodiment, the present application has a dishwashing detergent for dishwashers as its object. In terms of the present application, dishwashing detergents for dishwashers are compositions that can be used to clean soiled dishes in a mechanical dishwashing process. The dishwashing detergents for dishwashers according to the invention thus differ from rinse aids, which are always used in combination with dishwashing detergents for dishwashers and do not have any cleaning effect of their own.

Insofar as it is stated in the present application that the detergent or cleaning agent according to the invention comprises something overall or in the at least one first phase (1) or in the at least one second phase (2), this shall also be regarded as disclosing the fact that detergents or cleaning agents or the respective phase can consist thereof. In the following exemplary embodiment, the detergent or cleaning agent according to the invention is described in a non-limiting manner.

Exemplary Embodiments

Cleaning agents according to the invention were prepared which comprised a first phase and a second phase. Different geometries were realized. Moreover, cleaning agents were prepared that comprised two first phases and one second phase. The following specifications refer to wt % (weight percent) of active substance with respect to the total weight of the respective phase.

The first phases had the following composition:

| | Wt % |
|---|---|
| Citrate, Na salt | 10-25 |
| Phosphonate (e.g., HEDP) | 0-10 |
| MGDA, Na salt | 0-40 |
| Disilicate, Na salt | 0-40 |
| Soda | 10-30 |
| Percarbonate, Na salt | 5.0-20.0 |
| Bleach catalyst (preferably Mn-based) | 0.0-0.8 |
| Bleach activator (e.g., TAED) | 1.0-4.0 |
| Nonionic surfactant(s), e.g., fatty alcohol ethoxylate, preferably 20-40 EO, optionally end-capped | 1.5-15.0 |
| Polycarboxylate | 0.5-15 |
| Cationic copolymer | 0.0-1.0 |
| Disintegrant-(e.g., crosslinked PVP) | 0.0-3.0 |
| Protease preparation (tq) | 1.0-7 |
| Amylase preparation (tq) | 0.2-6 |
| Silver anti-tarnishing agent (benzotriazole) | 0.0-1.0 |
| Perfume | 0.0-0.5 |
| Dye solution | 0.0-1.5 |
| Zn salt (e.g., acetate) | 0.01-0.5 |
| Sodium sulfate | 0.0-25 |
| Water | 0.0-3 |
| pH adjuster (e.g., citric acid) | 0.0-5 |
| Processing aids | 0-10 |

Moreover, first phases were prepared which had the following composition:

| | Wt % |
|---|---|
| Citrate, Na salt | 15-20 |
| Phosphonate (e.g., HEDP) | 2.5-7.5 |
| MGDA, Na salt | 0-25 |
| Disilicate, Na salt | 5-35 |
| Soda | 10-25 |
| Percarbonate, Na salt | 10-15 |
| Bleach catalyst (preferably Mn-based) | 0.02-0.5 |
| Bleach activator (e.g., TAED) | 1-3 |
| Nonionic surfactant(s), e.g., fatty alcohol ethoxylate, preferably 20-40 EO, optionally end-capped | 2.5-10 |
| Polycarboxylate | 4-10 |
| Cationic copolymer | 0-0.75 |
| Disintegrant-(e.g., crosslinked PVP) | 0-1.5 |
| Protease preparation (tq) | 1.5-5 |
| Amylase preparation (tq) | 0.5-3 |
| Silver anti-tarnishing agent (benzotriazole) | 0-0.5 |
| Perfume | 0.05-0.25 |
| Dye solution | 0.0-1 |

-continued

| | Wt % |
|---|---|
| Zn salt (e.g., acetate) | 0.1-0.3 |
| Sodium sulfate | 0.0-10 |
| Water | 0.0-1.5 |
| pH adjuster (e.g., citric acid) | 0-1.5 |
| Processing aids | 0-5 |

Figure 4:
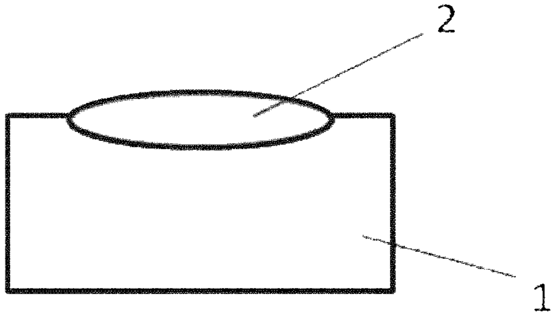
FIG. 4 schematically shows the arrangement of the second phase (2), in the form of a core, embedded in the first phase (1).

The first phases were present in the form of a compacted tablet with a recess on one side. A liquid composition was poured into these which yielded the second phase after curing. The cleaning agent that was obtained was in the form as shown in FIG. 4. There were additional first phases without a recess. Here, a second phase was brought into direct contact with the surface of the first phase.

The second phases had the following composition:

| | Wt % |
|---|---|
| Glycerin | 10-50 |
| Propanediol (preferably 1,3-propanediol) | 10-50 |
| Polycarboxylate homo-and/or copolymer with sulfonic acid-containing groups | 0-30 |
| Nonionic surfactant(s), e.g., fatty alcohol ethoxylate, preferably 20-40 EO, optionally end-capped | 0-40 |
| Polyethylene glycol avg. Mr 1,000-2,000 | 0-20 |
| Thickener (preferably gelatin or PVA) | 5-50 |
| Processing aids | 0-10 |
| Dye solution | 0.0-1.5 |

Additional second phases having the following composition were prepared:

| | Wt % |
|---|---|
| Glycerin | 20-45 |
| Propanediol (preferably 1,3-propanediol) | 10-30 |
| Polycarboxylate; homo- and/or copolymer with sulfonic acid-containing groups | 5-20 |
| Nonionic surfactant(s), e.g., fatty alcohol ethoxylate, preferably 20-40 EO, optionally end-capped | 5-25 |
| Polyethylene glycol avg. Mr 1,000-2,000 | 0-8 |
| Thickener (preferably gelatin or PVA) | 10-20 |
| Processing aids | 0-5 |
| Dye solution | 0.0-0.5 |

The first and second phases were able to be combined with each other in any way. The spatial configuration of the second phase, which was a liquid after the mixing of the ingredients and dimensionally stable within a setting time of about 10 to 15 minutes, was predetermined by the spatial configuration of the first phase and by shapes that are customary in the trade or self-designed. The liquid second phase was introduced into these molds and, after the setting time, the molds were removed without altering the second phase. Unlimited geometries of the second phase were made possible in this way.

TABLE 1

Examples of compositions of a second phase

| | A1 | A2 |
|---|---|---|
| 1,2-propanediol | 0.0 | 31 |
| 1,3-propanediol | 31 | 0.0 |
| Trisodium citrate * 2 $H_2O$ | 8 | 8 |
| Glycerin | 31 | 31 |
| Gelatin 60 Bloom | 15 | 15 |
| Nonionic surfactant | 15 | 15 |
| Setting time (20° C.)/min | 5 | 20 |
| Feel of the surface after 12 h of storage at 20° C. | Dry | Moist |

It can be seen from table 1 that 1,3-propanediol leads to a quicker setting of the dimensionally stable second phase.

TABLE 2

Additional examples of compositions of a second phase

| | B1 | B2 | B3 | B4 |
|---|---|---|---|---|
| 1,2-propanediol | 45 | 0.0 | 0.0 | 0.0 |
| 1,3-propanediol | 0.0 | 45 | 0.0 | 0.0 |
| 1,3 butanediol | 0.0 | 0.0 | 45 | 0.0 |
| 1,4 butanediol | 0.0 | 0.0 | 0.0 | 45 |
| Glycerin | 29 | 29 | 29 | 29 |
| Maltodextrin | 5 | 5 | 5 | 5 |
| Gelatin 60 Bloom | 20 | 20 | 20 | 20 |
| Nonionic surfactant | 1 | 1 | 1 | 1 |
| Setting time (20° C.)/min | 15 | 5 | 5 | 5 |
| Transparency | Transparent | Transparent | Opaque | Opaque |
| Feel of the surface after 12 h of storage at 20° C. | Dry | Dry | Greasy | Greasy |

TABLE 3

Storage stability after storage of the second phase for 12 days at 40° C. (poured into the depression of a dishwashing detergent tablet)

| | $C_1$ | $C_2$ |
|---|---|---|
| 1,2-propanediol | 47 | 0.0 |
| 1,3-propanediol | 0.0 | 47 |
| Glycerin | 20 | 20 |
| Sulfonic acid group-containing polymer (ground) | 8 | 8 |
| Gelatin 180 Bloom | 25 | 25 |
| Setting time (20° C.)/min | 15 | 5 |
| After storage, 40° C., 12 days: | | |
| Adhesion between first and second phase | Low | Very good |
| Feel/visual appearance of the second phase (surface) | Dry, shiny, transparent | Dry, shiny, transparent |

What is claimed is:

1. A detergent or cleaning agent comprising at least one first phase and at least one second phase that is different from said first phase, wherein the at least one first phase is solid and particularly compressed and the at least one second phase comprises at least one polymer, and at least two polyvalent alcohols, and wherein the at least one second phase is dimensionally stable, linear-elastic and transparent, wherein the at least two polyvalent alcohols comprise a first polyvalent alcohol comprising an alkanetriol, and a second polyvalent alcohol comprising an alkanediol, and wherein the at least one polymer comprises a combination of gelatin and from 1 to 30 wt %, based on the weight of the at least one second phase, of a sulfopolymer containing a sulfonic acid group containing monomer.

2. The detergent or cleaning agent as set forth in claim 1, wherein the alkanetriol is a $C_3$ to $C_8$ alkanetriol.

3. The detergent or cleaning agent as set forth in claim 1, wherein the alkanediol is a $C_3$ to $C_8$ alkanediol.

4. The detergent or cleaning agent as set forth in claim 1, wherein the two OH groups of the alkanediol are not arranged on immediately adjacent C atoms of the alkyl chain, and that three or four carbon atoms are located between the two OH groups.

5. The detergent or cleaning agent as set forth in claim 1, wherein the at least one second phase is substantially water-free.

6. The detergent or cleaning agent as set forth in claim 1, wherein at least one polymer further comprises a polyvinyl alcohol.

7. The detergent or cleaning agent as set forth in claim 1, wherein the at least one first phase and/or the at least one second phase comprises at least one surfactant.

8. The detergent or cleaning agent as set forth in claim 1, wherein the detergent or cleaning agent is present in the form of a tablet, with the weight ratio of the at least one first phase to the at least one second phase being 20:1 to 8:1.

9. The detergent or cleaning agent as set forth in claim 1, wherein the alkanetriol is a $C_3$ to $C_{10}$ alkanetriol, and the alkanediol is a $C_3$ to $C_{10}$ alkanediol.

10. The detergent or cleaning agent as set forth in claim 2, wherein the alkanetriol is a $C_3$ to $C_6$ alkanetriol.

11. The detergent or cleaning agent as set forth in claim 10, wherein the alkanetriol is glycerin.

12. The detergent or cleaning agent as set forth in claim 10, wherein the alkanetriol is 1,1,1-trimethylolpropane.

13. The detergent or cleaning agent as set forth in claim 3, wherein the alkanediol is a $C_3$ to $C_5$ alkanediol.

14. The detergent or cleaning agent as set forth in claim 7, wherein the at least one first phase and/or the at least one second phase comprises at least one nonionic surfactant.

* * * * *